(12) United States Patent
Sorin et al.

(10) Patent No.: US 11,970,161 B2
(45) Date of Patent: Apr. 30, 2024

(54) APPARATUS, METHOD AND ARTICLE TO FACILITATE MOTION PLANNING OF AN AUTONOMOUS VEHICLE IN AN ENVIRONMENT HAVING DYNAMIC OBJECTS

(71) Applicants: DUKE UNIVERSITY, Durham, NC (US); BROWN UNIVERSITY, Providence, RI (US)

(72) Inventors: Daniel Sorin, Durham, NC (US); William Floyd-Jones, Durham, NC (US); Sean Murray, Durham, NC (US); George Konidaris, Durham, NC (US); William Walker, Durham, NC (US)

(73) Assignees: DUKE UNIVERSITY, Durham, NC (US); BROWN UNIVERSITY, Providence, RI (US)

(*) Notice: Subject to any disclaimer, the term of this patent is extended or adjusted under 35 U.S.C. 154(b) by 0 days.

(21) Appl. No.: 17/682,732

(22) Filed: Feb. 28, 2022

(65) Prior Publication Data

US 2022/0176951 A1 Jun. 9, 2022

Related U.S. Application Data

(63) Continuation of application No. 16/240,086, filed on Jan. 4, 2019, now Pat. No. 11,292,456.
(Continued)

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *G05D 1/0088* (2013.01);
(Continued)

(58) Field of Classification Search
None
See application file for complete search history.

(56) References Cited

U.S. PATENT DOCUMENTS

| 4,163,183 A | 7/1979 | Engelberger et al. |
| 4,300,198 A | 11/1981 | Davini |

(Continued)

FOREIGN PATENT DOCUMENTS

| CN | 101837591 A | 9/2010 |
| CN | 102186638 A | 9/2011 |

(Continued)

OTHER PUBLICATIONS

Motion Planning, 2009 (Year: 2009).*
(Continued)

*Primary Examiner* — Christian Chace
*Assistant Examiner* — Shayne M. Gilbertson
(74) *Attorney, Agent, or Firm* — Talem IP Law, LLP

(57) ABSTRACT

A motion planner of an autonomous vehicle's computer system uses reconfigurable collision detection architecture hardware to perform a collision assessment on a planning graph for the vehicle prior to execution of a motion plan. For edges on the planning graph, which represent transitions in states of the vehicle, the system sets a probability of collision with a dynamic object in the environment based at least in part on the collision assessment. Depending on whether the goal of the vehicle is to avoid or collide with a particular dynamic object in the environment, the system then performs an optimization to identify a path in the resulting planning graph with either a relatively high or relatively low (Continued)

potential of a collision with the particular dynamic object. The system then causes the actuator system of the vehicle to implement a motion plan with the applicable identified path based at least in part on the optimization.

24 Claims, 15 Drawing Sheets

Related U.S. Application Data

(60) Provisional application No. 62/775,257, filed on Dec. 4, 2018, provisional application No. 62/616,783, filed on Jan. 12, 2018.

(51) Int. Cl.
  *G05D 1/00*     (2006.01)
  *G05D 1/02*     (2020.01)
  *G06V 20/58*    (2022.01)

(52) U.S. Cl.
  CPC ......... *G05D 1/0214* (2013.01); *G05D 1/0217* (2013.01); *G05D 1/0274* (2013.01); *G06V 20/58* (2022.01); *G05D 2201/0213* (2013.01)

(56) References Cited

U.S. PATENT DOCUMENTS

| | | | |
|---|---|---|---|
| 4,862,373 A | 8/1989 | Meng | |
| 4,949,277 A | 8/1990 | Trovato et al. | |
| 5,347,459 A | 9/1994 | Greenspan et al. | |
| 5,544,282 A | 8/1996 | Chen et al. | |
| 5,795,297 A | 8/1998 | Daigle | |
| 6,004,016 A | 12/1999 | Spector | |
| 6,049,756 A | 4/2000 | Libby | |
| 6,089,742 A | 7/2000 | Warmerdam et al. | |
| 6,259,988 B1* | 7/2001 | Galkowski | G01C 21/20 340/995.22 |
| 6,470,301 B1 | 10/2002 | Barral | |
| 6,493,607 B1 | 12/2002 | Bourne et al. | |
| 6,526,372 B1 | 2/2003 | Orschel et al. | |
| 6,526,373 B1 | 2/2003 | Barral | |
| 6,529,852 B2 | 3/2003 | Knoll et al. | |
| 6,539,294 B1 | 3/2003 | Kageyama | |
| 6,629,037 B1 | 9/2003 | Nyland | |
| 6,671,582 B1 | 12/2003 | Hanley | |
| 7,577,498 B2 | 8/2009 | Jennings et al. | |
| 7,609,020 B2 | 10/2009 | Kniss et al. | |
| 7,865,277 B1 | 1/2011 | Larson et al. | |
| 7,940,023 B2 | 5/2011 | Kniss et al. | |
| 8,082,064 B2 | 12/2011 | Kay | |
| 8,315,738 B2 | 11/2012 | Chang et al. | |
| 8,571,706 B2 | 10/2013 | Zhang et al. | |
| 8,666,548 B2 | 3/2014 | Lim | |
| 8,825,207 B2 | 9/2014 | Kim et al. | |
| 8,825,208 B1 | 9/2014 | Benson | |
| 8,855,812 B2 | 10/2014 | Kapoor | |
| 8,880,216 B2 | 11/2014 | Zumi et al. | |
| 8,972,057 B1 | 3/2015 | Freeman et al. | |
| 9,092,698 B2 | 7/2015 | Buehler et al. | |
| 9,102,055 B1 | 8/2015 | Konolige et al. | |
| 9,227,322 B2 | 1/2016 | Graca et al. | |
| 9,280,899 B2* | 3/2016 | Biess | G08G 1/166 |
| 9,327,397 B1 | 5/2016 | Williams et al. | |
| 9,333,044 B2 | 5/2016 | Olson | |
| 9,434,072 B2 | 9/2016 | Buehler et al. | |
| 9,475,192 B2 | 10/2016 | Liang et al. | |
| 9,539,058 B2 | 1/2017 | Tsekos et al. | |
| 9,632,502 B1 | 4/2017 | Levinson et al. | |
| 9,645,577 B1 | 5/2017 | Frazzoli et al. | |
| 9,687,982 B1 | 6/2017 | Jules et al. | |
| 9,687,983 B1 | 6/2017 | Prats | |
| 9,701,015 B2 | 7/2017 | Buehler et al. | |
| 9,707,682 B1 | 7/2017 | Konolige et al. | |
| 9,731,724 B2 | 8/2017 | Yoon | |
| 9,981,382 B1 | 5/2018 | Strauss et al. | |
| 9,981,383 B1 | 5/2018 | Nagarajan | |
| 9,993,923 B2 | 6/2018 | Terada | |
| 10,035,266 B1 | 7/2018 | Kroeger | |
| 10,099,372 B2 | 10/2018 | Vu et al. | |
| 10,124,488 B2 | 11/2018 | Lee et al. | |
| 10,131,053 B1 | 11/2018 | Sampedro et al. | |
| 10,300,605 B2 | 5/2019 | Sato | |
| 10,303,180 B1 | 5/2019 | Prats | |
| 10,430,641 B2* | 10/2019 | Gao | G06T 7/292 |
| 10,705,528 B2 | 7/2020 | Wierzynski et al. | |
| 10,723,024 B2 | 7/2020 | Konidaris et al. | |
| 10,782,694 B2* | 9/2020 | Zhang | G08G 1/167 |
| 10,792,114 B2 | 10/2020 | Hashimoto et al. | |
| 10,959,795 B2 | 3/2021 | Hashimoto et al. | |
| 11,358,337 B2 | 6/2022 | Czinger et al. | |
| 11,623,494 B1 | 4/2023 | Amicar et al. | |
| 2002/0013675 A1 | 1/2002 | Knoll et al. | |
| 2002/0074964 A1 | 6/2002 | Quaschner et al. | |
| 2003/0155881 A1 | 8/2003 | Hamann et al. | |
| 2004/0249509 A1 | 12/2004 | Rogers et al. | |
| 2005/0071048 A1 | 3/2005 | Watanabe et al. | |
| 2005/0216181 A1* | 9/2005 | Estkowski | G08G 1/164 340/995.23 |
| 2006/0235610 A1* | 10/2006 | Ariyur | G01C 21/005 701/533 |
| 2006/0247852 A1 | 11/2006 | Kortge et al. | |
| 2007/0106422 A1 | 5/2007 | Jennings et al. | |
| 2007/0112700 A1 | 5/2007 | Den Haan et al. | |
| 2008/0012517 A1 | 1/2008 | Kniss et al. | |
| 2008/0125893 A1 | 5/2008 | Tilove et al. | |
| 2008/0186312 A1 | 8/2008 | Ahn et al. | |
| 2008/0234864 A1 | 9/2008 | Sugiura et al. | |
| 2009/0055024 A1 | 2/2009 | Kay | |
| 2009/0192710 A1 | 7/2009 | Eidehall et al. | |
| 2009/0234499 A1 | 9/2009 | Nielsen et al. | |
| 2009/0295323 A1 | 12/2009 | Papiernik et al. | |
| 2009/0326711 A1 | 12/2009 | Chang et al. | |
| 2009/0326876 A1 | 12/2009 | Miller | |
| 2010/0145516 A1 | 6/2010 | Cedoz et al. | |
| 2010/0235033 A1 | 9/2010 | Yamamoto et al. | |
| 2011/0036188 A1 | 2/2011 | Fujioka et al. | |
| 2011/0066282 A1 | 3/2011 | Bosscher et al. | |
| 2011/0153080 A1 | 6/2011 | Shapiro et al. | |
| 2011/0211938 A1 | 9/2011 | Eakins et al. | |
| 2011/0264111 A1 | 10/2011 | Nowlin et al. | |
| 2012/0010772 A1 | 1/2012 | Pack et al. | |
| 2012/0083964 A1* | 4/2012 | Montemerlo | G06T 7/74 701/25 |
| 2012/0215351 A1 | 8/2012 | McGee et al. | |
| 2012/0297733 A1 | 11/2012 | Pierson et al. | |
| 2012/0323357 A1 | 12/2012 | Zumi et al. | |
| 2013/0076866 A1 | 3/2013 | Drinkard et al. | |
| 2013/0346348 A1 | 12/2013 | Buehler et al. | |
| 2014/0012419 A1 | 1/2014 | Nakajima | |
| 2014/0025201 A1 | 1/2014 | Ryu et al. | |
| 2014/0025203 A1 | 1/2014 | Inazumi | |
| 2014/0058406 A1 | 2/2014 | Tsekos | |
| 2014/0067121 A1 | 3/2014 | Brooks et al. | |
| 2014/0079524 A1 | 3/2014 | Shimono et al. | |
| 2014/0121833 A1 | 5/2014 | Lee et al. | |
| 2014/0121837 A1 | 5/2014 | Hashiguchi et al. | |
| 2014/0147240 A1 | 5/2014 | Noda et al. | |
| 2014/0156068 A1 | 6/2014 | Graca et al. | |
| 2014/0249741 A1* | 9/2014 | Levien | G05D 1/12 701/302 |
| 2014/0251702 A1 | 9/2014 | Berger et al. | |
| 2014/0309916 A1 | 10/2014 | Bushnell | |
| 2015/0005785 A1 | 1/2015 | Olson | |
| 2015/0037131 A1 | 2/2015 | Girtman et al. | |
| 2015/0051783 A1 | 2/2015 | Tamir et al. | |
| 2015/0134111 A1 | 5/2015 | Nakajima | |
| 2015/0239127 A1 | 8/2015 | Barajas et al. | |
| 2015/0261899 A1 | 9/2015 | Atohira et al. | |
| 2015/0266182 A1 | 9/2015 | Strandberg | |
| 2015/0273685 A1 | 10/2015 | Linnell et al. | |
| 2016/0001775 A1 | 1/2016 | Wilhelm et al. | |
| 2016/0008078 A1 | 1/2016 | Azizian et al. | |

(56) References Cited

U.S. PATENT DOCUMENTS

| | | | |
|---|---|---|---|
| 2016/0016315 | A1 | 1/2016 | Kuffner, Jr. et al. |
| 2016/0107313 | A1 | 4/2016 | Hoffmann et al. |
| 2016/0112694 | A1 | 4/2016 | Nishi et al. |
| 2016/0121486 | A1 | 5/2016 | Lipinski et al. |
| 2016/0121487 | A1 | 5/2016 | Mohan et al. |
| 2016/0154408 | A1 | 6/2016 | Eade et al. |
| 2016/0161257 | A1* | 6/2016 | Simpson .............. G05D 1/0206 701/408 |
| 2016/0299507 | A1 | 10/2016 | Shah et al. |
| 2016/0324587 | A1 | 11/2016 | Olson |
| 2016/0357187 | A1 | 12/2016 | Ansari |
| 2017/0004406 | A1 | 1/2017 | Aghamohammadi |
| 2017/0028559 | A1 | 2/2017 | Davidi et al. |
| 2017/0057087 | A1 | 3/2017 | Lee |
| 2017/0120448 | A1* | 5/2017 | Lee ...................... G05D 1/0214 |
| 2017/0123419 | A1 | 5/2017 | Levinson et al. |
| 2017/0132334 | A1 | 5/2017 | Levinson et al. |
| 2017/0146999 | A1 | 5/2017 | Cherepinsky et al. |
| 2017/0157769 | A1 | 6/2017 | Aghamohammadi et al. |
| 2017/0168485 | A1 | 6/2017 | Berntorp et al. |
| 2017/0168488 | A1* | 6/2017 | Wierzynski .......... G05D 1/0274 |
| 2017/0193830 | A1* | 7/2017 | Fragoso ................. G08G 5/045 |
| 2017/0210008 | A1 | 7/2017 | Maeda |
| 2017/0305015 | A1 | 10/2017 | Krasny et al. |
| 2017/0315530 | A1 | 11/2017 | Godau et al. |
| 2018/0001472 | A1 | 1/2018 | Konidaris et al. |
| 2018/0001476 | A1 | 1/2018 | Tan et al. |
| 2018/0029231 | A1 | 2/2018 | Davis |
| 2018/0029233 | A1 | 2/2018 | Lager |
| 2018/0074505 | A1 | 3/2018 | Lv et al. |
| 2018/0113468 | A1 | 4/2018 | Russell |
| 2018/0136662 | A1* | 5/2018 | Kim ...................... G08G 1/166 |
| 2018/0150077 | A1 | 5/2018 | Danielson et al. |
| 2018/0172450 | A1 | 6/2018 | Lalonde et al. |
| 2018/0173242 | A1 | 6/2018 | Lalonde et al. |
| 2018/0189683 | A1* | 7/2018 | Newman ................ B60L 58/12 |
| 2018/0222050 | A1 | 8/2018 | Vu et al. |
| 2018/0222051 | A1 | 8/2018 | Vu et al. |
| 2018/0229368 | A1 | 8/2018 | Leitner et al. |
| 2018/0281786 | A1 | 10/2018 | Oyaizu et al. |
| 2018/0326582 | A1 | 11/2018 | Yokoyama et al. |
| 2018/0339456 | A1 | 11/2018 | Czinger et al. |
| 2019/0015981 | A1 | 1/2019 | Yabushita et al. |
| 2019/0039242 | A1 | 2/2019 | Fujii et al. |
| 2019/0086925 | A1 | 3/2019 | Fan et al. |
| 2019/0143518 | A1 | 5/2019 | Maeda |
| 2019/0163191 | A1 | 5/2019 | Sorin et al. |
| 2019/0164430 | A1 | 5/2019 | Nix |
| 2019/0196480 | A1 | 6/2019 | Taylor |
| 2019/0216555 | A1 | 7/2019 | DiMaio et al. |
| 2019/0232496 | A1 | 8/2019 | Graichen et al. |
| 2019/0262993 | A1 | 8/2019 | Cole et al. |
| 2019/0293443 | A1* | 9/2019 | Kelly .................. G01C 21/3484 |
| 2019/0391597 | A1 | 12/2019 | Dupuis |
| 2020/0069134 | A1 | 3/2020 | Ebrahimi Afrouzi et al. |
| 2020/0097014 | A1 | 3/2020 | Wang |
| 2020/0215686 | A1 | 7/2020 | Vijayanarasimhan et al. |
| 2020/0331146 | A1 | 10/2020 | Vu et al. |
| 2020/0338730 | A1 | 10/2020 | Yamauchi et al. |
| 2020/0338733 | A1 | 10/2020 | Dupuis et al. |
| 2020/0353917 | A1 | 11/2020 | Leitermann et al. |
| 2020/0368910 | A1 | 11/2020 | Chu et al. |
| 2021/0009351 | A1 | 1/2021 | Beinhofer et al. |
| 2022/0339875 | A1 | 10/2022 | Czinger et al. |
| 2023/0063205 | A1 | 3/2023 | Nerkar et al. |

FOREIGN PATENT DOCUMENTS

| | | |
|---|---|---|
| CN | 102814813 A | 12/2012 |
| CN | 103722565 A | 4/2014 |
| CN | 104407616 A | 3/2015 |
| CN | 104858876 A | 8/2015 |
| CN | 106660208 A | 5/2017 |
| CN | 107073710 A | 8/2017 |
| CN | 107486858 A | 12/2017 |
| CN | 108297059 A | 7/2018 |
| CN | 108789416 A | 11/2018 |
| CN | 108858183 A | 11/2018 |
| CN | 108942920 A | 12/2018 |
| CN | 109521763 A | 3/2019 |
| CN | 109782763 A | 5/2019 |
| CN | 114073585 A | 2/2022 |
| EP | 1901150 A1 | 3/2008 |
| EP | 2306153 A2 | 4/2011 |
| EP | 3250347 A1 | 12/2017 |
| EP | 3486612 A1 | 5/2019 |
| EP | 3725472 A1 | 10/2020 |
| JP | 11-249711 A | 9/1999 |
| JP | 11-296229 A | 10/1999 |
| JP | 2002-073130 A | 3/2002 |
| JP | 2003127077 A | 5/2003 |
| JP | 2005032196 A | 2/2005 |
| JP | 2006-224740 A | 8/2006 |
| JP | 2007257274 A | 10/2007 |
| JP | 2008-65755 A | 3/2008 |
| JP | 2008134165 A | 6/2008 |
| JP | 2009-116860 A | 5/2009 |
| JP | 2010-061293 A | 3/2010 |
| JP | 2010210592 A | 9/2010 |
| JP | 2011-75382 A | 4/2011 |
| JP | 2012056023 A | 3/2012 |
| JP | 2012-190405 A | 10/2012 |
| JP | 2012-243029 A | 12/2012 |
| JP | 2013193194 A | 9/2013 |
| JP | 2014-184498 A | 10/2014 |
| JP | 2015044274 A | 3/2015 |
| JP | 2015-517142 A | 6/2015 |
| JP | 2015208811 A | 11/2015 |
| JP | 2016099257 A | 5/2016 |
| JP | 2017136677 A | 8/2017 |
| JP | 2018-505788 A | 3/2018 |
| JP | 2018144158 A | 9/2018 |
| JP | 2018144166 A | 9/2018 |
| KR | 19980024584 A | 7/1998 |
| KR | 10-2011-0026776 A | 3/2011 |
| KR | 20130112507 A | 10/2013 |
| KR | 20150126482 A | 11/2015 |
| KR | 10-2017-0018564 A | 2/2017 |
| KR | 10-2017-0044987 A | 4/2017 |
| KR | 10-2017-0050166 A | 5/2017 |
| KR | 20180125646 A | 11/2018 |
| TW | 201318793 A | 5/2013 |
| WO | 99/24914 A1 | 5/1999 |
| WO | 2015113203 A1 | 8/2015 |
| WO | 2016/122840 A1 | 8/2016 |
| WO | 2017168187 A1 | 10/2017 |
| WO | 2017/214581 A1 | 12/2017 |
| WO | 2018043525 A1 | 3/2018 |
| WO | 2019/183141 A1 | 9/2019 |
| WO | 2020040979 A1 | 2/2020 |
| WO | 2020117958 A1 | 6/2020 |

OTHER PUBLICATIONS

Jia Pan, Efficient Configuration Space Construction and Optimization for Motion Planning, 2015, Research Robotics, Whole Document (Year: 2015).*

Lydia Kravaki, Probabilistic Roadmaps for Path Planning in High-Dimensional Configuration Spaces, 1996, Whole Document (Year: 1996).*

Chao Chen, Motion Planning for Nonholonomic Vehicles with Space Exploration Guided Heuristic Search, 2016, IEEE.com, Whole Document (Year: 2016).*

Kavraki et al, "Probabilistic roadmaps for path planning in high-dimensional confirguration spaces", IEEE Transactions on Robotics and Automation, vol. 12, No. 4, pp. 566-580, Aug. 1996.

International Search Report and Written Opinion Issued in PCT Application No. PCT/US17/36880, dated Oct. 10, 2017, 15 Pages.

Hauck, Scott et al. "Configuration Compression for the Xilinx XC6200 FPGA," IEEE Transactions on Computer-Aided Design of Integrated Circuits and Systems, vol. 18, No. 8, 1998, 9 Pages.

(56) References Cited

OTHER PUBLICATIONS

Atay et al., "A Motion Planning Processor on Reconfigurable Hardware," All Computer Science and Engineering Research, Sep. 23, 2005, 13 Pages, Report No. WUCSE-2005-46, Department of Computer Science & Engineering—Washington University in St. Louis, St. Louis, MO.
Rodriguez, Carlos et al. "Planning manipulation movements of a dual-arm System considering obstacle removing," Robotics and Autonomous Systems, Elsevier Science Publishers, Amsterdam, NL, vol. 62, No. 12, Aug. 1, 2014, 11 Pages.
International Search Report and Written Opinion Issued in PCT Application No. PCT/US2016/012204, dated Mar. 21, 2016, 10 Pages.
First Office Action Issued in Japanese Patent Application No. 2017-557268, dated Aug. 7, 2018, 15 Pages.
Extended European Search Report Issued in European Application No. 16743821.7, dated Apr. 10, 2018, 9 Pages.
Second Office Action Issued in Japanese Patent Application No. 2017-557268, dated Feb. 26, 2019, 5 Pages.
Invitation to Pay Additional Fees and, Where Applicable, Protest Fee Issued in PCT/US17/36880, dated Aug. 14, 2017, 2 pages.
Extended European Search Report Issued in European Application No. 17811131.6, dated Apr. 24, 2019, 16 Pages.
Sean Murray et al., "Robot Motion Planning on a Chip", Robotics: Science and Systems 2016, Jun. 22, 2016, 9 pages.
International Search Report and Written Opinion Issued in PCT/US2019/012209, dated Apr. 25, 2019, 26 pages.
Sean Murray et al., "The microarchitecture of a real-time robot motion planning accelerator", 2016 49th Annual IEEE/ACM International Symposium on Microarchitecture (Micro), IEEE, Oct. 15, 2016, 12 pages.
Extended European Search Report Issued in European Application No. 18209405.2, dated Aug. 2, 2019, 10 Pages.
International Search Report and Written Opinion Issued in International Application No. PCT/US2019/023031, dated Aug. 14, 2019, 19 pages.
International Search Report and Written Opinion Issued in International Application No. PCT/US2019/016700, dated May 20, 2019, 14 pages.
Merriam-Webster, "Definition of Or", Retrieved Sep. 9, 2019, 12 pages, https://www.merriam-webster.com/ dictionary/or.
Non-Final Office Action Issued in U.S. Appl. No. 15/546,441, dated Sep. 17, 2019, 52 pages.
Office Action Issued in Japanese Application No. 2018-564836, dated Dec. 3, 2019, 3 Pages.
International Search Report and Written Opinion Issued in International Application No. PCT/US2019/045270, dated Nov. 25, 2019, 13 pages.
Mike Stilman et al., "Manipulation Planning Among Movable Objects", Proceedings of the IEEE Int. Conf. on Robotics and Automation (ICRA '07), Apr. 2007, 6 pages.
David E. Johnson et al., "Bound Coherence for Minimum Distance Computations", Proceedings of the 1999 IEEE International Conference on Robotics & Automation, May 1999, 6 pages.
Extended European Search Report issued in European Application No. 19893874.8, dated Jan. 5, 2022, 13 pages.
International Search Report and Written Opinion issued in International Application No. PCT/US2021/061427, dated Apr. 29, 2022, 14 pages.
International Search Report and Written Opinion issued in International Application No. PCT/US2021/013610, dated Apr. 22, 2021, 9 pages.
Non-Final Office Action issued in U.S. Appl. No. 16/909,096, dated May 6, 2022, 49 pages.
International Search Report and Written Opinion issued in International Application No. PCT/US2021/056317, dated Feb. 11, 2022, 13 pages.
Office Action issued in Japanese Application No. 2021-171704, dated Jan. 28, 2022, 3 pages.

Office Action issued in Japanese Application No. 2021-171726, dated Jan. 26, 2022, 4 pages.
Notice of Allowance issued in U.S. Appl. No. 16/308,693, dated Sep. 23, 2021, 23 pages.
Office Action Issued in Japanese Application No. 2018-564836, dated May 19, 2020, 3 Pages.
International Search Report and Written Opinion issued in International Application No. PCT/US2020/034551, dated Aug. 31, 2020, 16 pages.
International Search Report issued in PCT/US2019/064511, dated Mar. 27, 2020, 12 pages.
International Search Report issued in International Application No. PCT/US2020/039193, dated Sep. 29, 2020, 7 pages.
Non-Final Office Action Issued in U.S. Appl. No. 16/308,693, dated Dec. 11, 2020, 23 Pages.
Non-Final Office Action Issued in U.S. Appl. No. 16/240,086, dated Feb. 11, 2021, 57 Pages.
Non-Final Office Action Issued in U.S. Appl. No. 16/268,290, dated Jan. 27, 2021, 54 Pages.
Non-Final Office Action Issued in U.S. Appl. No. 16/308,693, dated May 14, 2021, 26 Pages.
Office Action Issued in Taiwanese Application No. 106119452, dated Jun. 16, 2021, 19 Pages.
Non-Final Office Action Issued in U.S. Appl. No. 16/268,290, dated Jun. 17, 2021, 35 Pages.
Non-Final Office Action Issued in U.S. Appl. No. 16/308,693, dated Jun. 1, 2020, 16 pages.
Reconsideration Report by Examiner before Appeal issued in Japanese Application No. 2018-564836, dated Jun. 2, 2021, 2 pages.
Final Office Action issued in U.S. Appl. No. 16/240,086, dated Aug. 2, 2021, 88 pages.
Extended European Search Report issued in European Application No. 19851097.6, dated Jul. 23, 2021, 15 pages.
J. A. Corrales et al. "Safe human-robot interaction based on dynamic sphere-swept line bounding volumes" Robotic and Computer-Integrated Manufacturing 27, 2011, 9 pages.
Angel P. Del Pobil et al. "A New Representation for Collision Avoidance and Detection" Proceedings of the 1992 IEEE International Conference on Robotics and Automation, May 1992, 7 pages.
Yuichi Sato et al. "Efficient Collision Detection Using Fast Distance-Calculation Algorithms for Convex and Non-Convex Objects" Proceedings of the 1996 IEEE International Conference on Robotics and Automation, Apr. 1996, 8 pages.
Alexander Martín Turrillas, "Improvement of a Multi-Body Collision Computation Framework and its Application to Robot (Self-) Collision Avoidance" German Aerospace Center (DLR) Institute of Robotics and Mechatronics, Master's Thesis, Jun. 1, 2015, 34 pages.
International Search Report and Written Opinion issued in International Application No. PCT/US2020/047429, dated Nov. 23, 2020, 9 pages.
Notice of Allowance issued in U.S. Appl. No. 16/268,290, dated Sep. 24, 2021, 8 pages.
Notice of Allowance issued in U.S. Appl. No. 16/240,086, dated Dec. 24, 2021, 28 pages.
"Motion Planning" 2009, 37 pages.
Jia Pan et al. "Efficient Configuration Space Construction and Optimization for Motion Planning" Engineering, Mar. 2015, vol. 1, Issue 1, 12 pages.
Chao Chen "Motion Planning for Nonholonomic Vehicles with Space Exploration Guided Heuristic Search" 2016, 140 pages.
Office Action issued in Japanese Application No. 2022-054900, dated Feb. 7, 2023, 7 pages.
Second Office Action issued in Japanese Patent Application No. 2022-054900, dated Jul. 18, 2023, 6 pages.
Schwesinger, Ulrich, "Motion Planning in Dynamic Environments with Application to Self-Driving Vehicles," (Doctoral dissertation), ETH, 2017, 65 pages, Zurich.
Li, Mingkang et al., "A Novel Cost Function for Decision-Making Strategies in Automotive Collision Avoidance Systems," 2018 IEEE International Conference on Vehicular Electronics and Safety (ICVES), Sep. 2018, pp. 1-8, EEE, Madrid.

(56) References Cited

OTHER PUBLICATIONS

Potthast, Christian et al., "Seeing with your hands: A better way to obtain perception capabilities with a personal robot," Advanced Robotics and Its Social Impacts, Oct. 2011, pp. 50-53, IEEE, Menlo Park, CA, USA.

López-Damian, Efraín et al., "Probabilistic view planner for 3D modelling indoor environments," 2009 IEEE/RSJ International Conference on Intelligent Robots and Systems, Oct. 2009, pp. 4021-4026, IEEE, St. Louis, MO.

Kececi, F. et al., "Improving visually servoed disassembly operations by automatic camera placement," Proceedings of the 1998 IEEE International Conference on Robotics and Automation, May 1998, pp. 2947-2952, vol. 4, IEEE, Leuven, Belgium.

Pires, E. J. Solteiro et al., "Robot Trajectory Planning Using Multi-objective Genetic Algorithm Optimization," Genetic and Evolutionary Computation -GECCO 2004, Lecture Notes in Computer Science (LNCS), Jun. 2004, pp. 615-626, vol. 3102, Springer Berlin Heidelberg.

Pashkevich, A. P. et al., "Multiobjective optimisation of robot location in a workcell using genetic algorithms," JKACC International Conference on Control '98, Sep. 1998, pp. 757-762, vol. 1998, publication No. 455, IET, Swansea, UK.

Ratliff, Nathan et al., "CHOMP: Gradient optimization techniques for efficient motion planning," 2009 IEEE International Conference on Robotics and Automation, May 2009, pp. 489-494, IEEE, Kobe.

Lim, Zhen Yang et al., "Multi-objective hybrid algorithms for layout optimization in multi-robot cellular manufacturing systems," Knowledge-Based Systems, Mar. 2017, (Accessible: Jan. 3, 2017), pp. 87-98, vol. 120.

Barral, D. et al., "Simulated Annealing Combined with a Constructive Algorithm for Optimising Assembly Workcell Layout," The International Journal of Advanced Manufacturing Technology, Apr. 20, 2001, pp. 593-602, vol. 17, Issue 8.

Tao, Long et al., "Optimization on multi-robot workcell layout in vertical plane," 2011 IEEE International Conference on Information and Automation, Jun. 2011, pp. 744-749, IEEE, Shenzhen, China.

Klampfl, Erica et al., "Optimization of workcell layouts in a mixed-model assembly line environment," International Journal of Flexible Manufacturing Systems, Oct. 10, 2006, pp. 277-299, vol. 17, Springer.

Kalawoun, Rawan, "Motion planning of multi-robot system for airplane stripping," (Doctoral dissertation) Universite Clermont Auvergne [2017-2020], Sep. 11, 2019, 167 pages.

Kapanoglu, Muzaffer et al., "A pattern-based genetic algorithm for multi-robot coverage path planning minimizing completion time," Journal of Intelligent Manufacturing, Aug. 2012, (Accessible: May 13, 2010), pp. 1035-1045, vol. 23, issue 4.

Hassan, Mahdi, et al. "Modeling and stochastic optimization of complete coverage under uncertainties in multi-robot base placements," 2016 IEEE/RSJ International Conference on Intelligent Robots and Systems (IROS), Oct. 2016, pp. 2978-84, IEEE, Daejeon, South Korea.

Hassan, Mahdi et al. "An approach to base placement for effective collaboration of multiple autonomous industrial robots," 2015 IEEE International Conference on Robotics and Automation (ICRA), May 2015, pp. 3286-3291, IEEE, Seattle, WA, USA.

Hassan, Mahdi et al., "Task oriented area partitioning and allocation for optimal operation of multiple industrial robots in unstructured environments," 2014 13th International Conference on Control Automation Robotics & Vision (ICARCV), Dec. 2014, pp. 1184-1189, IEEE, Marina Bay Sands, Singapore.

Hassan, Mahdi et al. "Simultaneous area partitioning and allocation for complete coverage by multiple autonomous Industrial robots," Autonomous Robots, Dec. 2017, (Accessible: Apr. 13, 2017), pp. 1609-1628, vol. 41, issue 8.

Mattmüller, Jan et al., "Calculating a near time-optimal jerk-constrained trajectory along a specified smooth path," The International Journal of Advanced Manufacturing Technology, Dec. 2009, (Accessible: Apr. 19, 2009), pp. 1007-1016, vol. 45, issue 9-10.

Extended European Search Report issued in European Application No. 20832308.9, mailed Jul. 18, 2022, 10 pages.

Extended European Search Report issued in European Application No. 20857383.2, mailed Jul. 25, 2022, 10 pages.

Second Office Action issued in United States U.S. Appl. No. 16/909,096, filed Sep. 7, 2022, 54 pages.

First Office Action issued in United States U.S. Appl. No. 16/999,339, filed Sep. 14, 2022, 18 pages.

First Office Action issued in United States U.S. Appl. No. 16/883,376, filed Sep. 27, 2022, 26 pages.

Extended European Search Report issued in European Application No. 21744840.6, mailed Nov. 7, 2022, 14 pages.

Notice of Allowance issued in United States U.S. Appl. No. 17/153,662, filed Dec. 6, 2022, 15 pages.

Search Report issued in Taiwanese Application No. 108104094, completed Feb. 4, 2023, 2 pages.

Office Action issued in Japanese Application No. 2021-571340, mailed Feb. 2, 2023, 10 pages.

Search Report issued in Chinese Application No. 201980024188.4, completed Feb. 17, 2023, 6 pages.

First Office Action issued in United States U.S. Appl. No. 16/981,467, filed Mar. 16, 2023, 19 pages.

First Office Action issued in United States U.S. Appl. No. 17/506,364, filed Apr. 28, 2023, 50 pages.

Extended European Search Report issued in European Patent Application No. 20818760.9, mailed May 10, 2023, 9 pages.

Search Report issued in Chinese Application No. 202080059714.3, mailed May 23, 2023, 3 pages.

Search Report issued in Chinese Application No. 202080040382.4, completed May 24, 2023, 6 pages.

Search Report issued in Chinese Application No. 202080055382.1, completed Jun. 26, 2023, 4 pages.

Search Report issued in Chinese Application No. 201980055188.0, completed Jun. 30, 2023, 2 pages.

International Search Report and Written Opinion issued in International Application No. PCT/US2023/064012, Mailed Jul. 10, 2023, 15 pages.

Office Action issued in Japanese Application No. 2021-571340, mailed Aug. 8, 2023, 8 pages.

First Office Action issued in United States U.S. Appl. No. 17/270,597, filed Aug. 18, 2023, 25 pages.

Second Office Action issued in United States U.S. Appl. No. 17/506,364, filed Aug. 25, 2023, 55 pages.

Extended European Search Report issued in European Application Case No. 21789270.2 mailed Sep. 1, 2023, 23 pages.

Search Report issued in Tawanese Application No. 108130161, completed Sep. 2, 2023, 3 pages.

Office Action issued in Japanese Application No. 2022-562247, mailed Sep. 25, 2023, 7 pages.

Office Action issued in Japanese Application No. 2022-556467, mailed Sep. 28, 2023, 10 pages.

Macfarlane, S. et al., "Jerk-bounded manipulator trajectory planning: design for real-time applications," IEEE Transactions on Robotics and Automation, Feb. 19, 2003, pp. 42-52, vol. 19, issue 1.

Dong, Jingyan et al., "Feed-rate optimization with jerk constraints for generating minimum-time trajectories," International Journal of Machine Tools and Manufacture, Oct. 2007, (Accessible: Mar. 24, 2007), pp. 1941-1955, vol. 47, issue 12-13.

Haschke, R. et al., "On-line planning of time-optimal, jerk-limited trajectories," 2008 IEEE/RSJ International Conference on Intelligent Robots and Systems, Sep. 2008, pp. 3248-3253, IEEE, Nice, France.

Bharathi, Akilan et al., "Feedrate optimization for smooth minimum-time trajectory generation with higher order constraints," The International Journal of Advanced Manufacturing Technology, Feb. 2016, (Accessible: Jun. 28, 2015), pp. 1029-1040, vol. 82, issue 5-8.

Lin, Jianjie et al., "An Efficient and Time-Optimal Trajectory Generation Approach for Waypoints Under Kinematic Constraints and Error Bounds," 2018 IEEE/RSJ International Conference on Intelligent Robots and Systems (IROS), Oct. 2018, pp. 5869-5876, IEEE, Madrid, Spain.

(56) References Cited

OTHER PUBLICATIONS

Perumaal, S. Saravana et al., "Automated Trajectory Planner of Industrial Robot for Pick-and-Place Task," International Journal of Advanced Robotic Systems, Feb. 2013, (Accessible: Jan. 1, 2013), p. 100, vol. 10, issue 2.

Gasparetto, A., and V. Zanotto, "A new method for smooth trajectory planning of robot manipulators," Mechanism and Machine Theory, Apr. 2007, (Accessible: Jun. 5, 2006), pp. 455-471, vol. 42, issue 4.

Gasparetto, A., A. Lanzutti, et al., "Experimental validation and comparative analysis of optimal time-jerk algorithms for trajectory planning," Robotics and Computer-Integrated Manufacturing, Apr. 2012, (Accessible: Sep. 29, 2011), pp. 164-181, vol. 28, issue 2.

\* cited by examiner

APPARATUS, METHOD AND ARTICLE TO FACILITATE MOTION PLANNING OF AN AUTONOMOUS VEHICLE IN AN ENVIRONMENT HAVING DYNAMIC OBJECTS

BACKGROUND

Technical Field

The present disclosure generally relates to motion planning, and in particular to systems and methods that facilitate motion planning of autonomous vehicles in environments having dynamic objects.

Description of the Related Art

Motion planning is a fundamental problem in autonomous vehicle control and robotics. A motion plan completely specifies a path an autonomous vehicle or robot can follow from a starting configuration state to a goal state, typically without colliding with any obstacles in an operational environment or with a reduced possibility of colliding with any objects in the operational environment. However, in some instances, interaction with objects in the operational environment may be desired, such as to inspect an object, collect information from an object, exchange information with an object, or even collide with an object, for instance as in a game. There are typically four main components involved in creating a motion plan: perception, roadmap construction (also referred to herein as a motion planning graph), collision detection and path search. Each provides challenges to overcome within an environment surrounding the autonomous vehicle or robot that includes static objects, and in particular, dynamic objects moving within the environment. It also may be possible that the future movements of the dynamic obstacles are unknown or uncertain. Such dynamic objects may be moving contrary to the goals of autonomous vehicle or robot. Thus, it is advantageous for the autonomous vehicle or robot to perform motion planning to keep up with those changes in real time to avoid collision or intercept such objects to achieve the goal state.

BRIEF SUMMARY

An autonomous vehicle's computer system may receive perception information that represents the environment in which the vehicle operates. The motion planner of the vehicle's computer system then uses reconfigurable collision detection architecture hardware to perform a collision assessment on a planning graph for the vehicle prior to execution of a motion plan. Each edge of the planning graph represents a transition of the vehicle from one state to another state and has an inherent cost associated with it. For example, such cost may be related fuel usage and other factors. Each edge has an initial weight corresponding to this cost. For edges on the planning graph, which represent transitions in states of the vehicle, the system sets a probability of collision with a dynamic object in the environment based at least in part on the collision assessment and then modifies the initial weights of the edges based on the probability of collision with the dynamic object. The system does this by assigning weights to each edge based on the probability of collision and then using these assigned weights to modify the initial weight for that edge that corresponds to the inherent cost. This may be performed, for example, by adding the assigned weight based on the probability of collision to the initial weight that corresponds to the inherent cost, or according to some other function or formula involving the assigned weight based on the probability of collision and the initial weight that corresponds to the inherent cost. For example, the system may assign a weight with a value equal to or greater than zero to edges of the planning graph if the respective edge has a relatively low respective probability of a collision with one or more dynamic objects. The system may assign a weight with a value less than zero to edges of the planning graph if the respective edge has a relatively high respective probability of a collision with one or more dynamic objects in the environment. In instances where the goal of the autonomous vehicle is to collide with dynamic objects in its environment, the system then performs an optimization to identify a path in the resulting planning graph with a relatively high potential of a collision with one or more dynamic objects in the environment in which the vehicle operates. The system then causes the actuator system of the vehicle to implement a motion plan with the relatively high potential of a collision with such dynamic objects based at least in part on the optimization.

In another embodiment, in instances where the goal of the autonomous vehicle is to avoid collision with particular dynamic objects, the motion planner performs an optimization to identify a path in the resulting planning graph that provides a longest route of travel of the vehicle (e.g., in time or distance) with a relatively low potential of a collision with such dynamic objects in the environment in which the vehicle operates. The system then causes the actuator system of the vehicle to implement a motion plan with the relatively low potential of a collision with one or more objects based at least in part on the optimization.

A method of operation in a processor-based system to determine paths for vehicles via planning graphs is described. Each planning graph may respectively include a plurality of nodes connected by edges, each node which represents, implicitly or explicitly, time and variables that characterize a state of the vehicle, which operates in an environment that includes one or more objects, and each edge represents a transition between a respective pair of nodes. The method may be summarized as including: receiving perception information that represents the environment in which the vehicle operates; performing a collision assessment on each of two or more of the edges of a resulting planning graph for the vehicle; for each of two or more edges of the resulting planning graph, setting a probability of collision based at least in part on the collision assessment; performing an optimization to identify a path in the resulting planning graph with a relatively high potential of a collision with one or more objects in the environment in which the vehicle operates; and implementing a motion plan with the relatively high potential of a collision with one or more objects in the environment in which the vehicle operates based at least in part on the optimization.

Performing an optimization to identify a path in the resulting planning graph with a relatively high potential of a collision with one or more objects in the environment in which the vehicle operates may include performing an optimization to identify a path in the resulting planning graph with a highest potential of a collision with one or more objects in the environment in which the vehicle operates.

Performing an optimization to identify a path in the resulting planning graph with a relatively high potential of a collision with one or more objects in the environment in which the vehicle operates may include performing an optimization to identify a path in the resulting planning graph with a highest potential of a collision with one or more objects in the environment in which the vehicle operates along an entire route of the vehicle in two-dimensional or three-dimensional space as specified by the path, a length of the route defined at least in part by when the vehicle runs out of a particular resource. Performing an optimization to identify a path in the resulting planning graph with a relatively high potential of a collision with one or more objects in the environment in which the vehicle operates may include performing an optimization to identify a path in the resulting planning graph with a relatively high potential of a collision in a shortest relative amount of time with one or more objects in the environment in which the vehicle operates.

Where at least one object in the environment is a dynamic object, setting a probability of collision for each of two or more edges of the planning graph based at least in part on the collision assessment may include setting a probability of collision for each of two or more edges of the planning graph based at least in part on a current trajectory of the dynamic object. Where at least one object in the environment is a dynamic object, setting a probability of collision for each of two or more edges of the planning graph based at least in part on the collision assessment may include setting a probability of collision for each of two or more edges of the planning graph based at least in part on a change in a trajectory of the dynamic object. Where at least one object in the environment is a dynamic object, setting a probability of collision for each of two or more edges of the planning graph based at least in part on the collision assessment may include setting a probability of collision for each of two or more edges of the planning graph based at least in part on a predicted trajectory of the dynamic object. Where at least one object in the environment is a dynamic object, setting a probability of collision for each of two or more edges of the planning graph based at least in part on the collision assessment may include setting a probability of collision for each of two or more edges of the planning graph based at least in part on a predicted trajectory of the dynamic object that is based at least in part on a change in a trajectory of the vehicle.

The resulting planning graph for the vehicle may be a multi-dimensional graph that represents both a position and a velocity of the vehicle, performing an optimization to identify a path in the resulting planning graph may include performing the optimization to identify a path in the resulting planning graph which represents the position and the velocity of the vehicle. Wherein the velocity represents both a speed and a direction (heading) of the vehicle, performing an optimization to identify a path in the resulting planning graph may include performing the optimization to identify a path in the resulting planning graph which represents the speed and the direction of the vehicle. Where the direction represents a pitch, a roll, and a yaw of the vehicle, performing an optimization to identify a path in the resulting planning graph may include performing the optimization to identify a path in the resulting planning graph which represents the pitch, the roll and the yaw of the vehicle. Where the resulting planning graph for the vehicle represents an acceleration of the vehicle, performing an optimization to identify a path in the resulting planning graph, may include performing the optimization to identify a path in the resulting planning graph which represents the acceleration of the vehicle. Where the planning graph for the vehicle represents a maximum time or distance of travel obtainable by the vehicle, performing an optimization to identify a path in the resulting planning graph may include performing the optimization to identify a path in the resulting planning graph which represents the maximum time or distance of travel obtainable by the vehicle. Where the planning graph for the vehicle represents an amount of fuel carried by the vehicle and a rate of fuel usage, performing an optimization to identify a path in the resulting planning graph may include performing the optimization to identify a path in the resulting planning graph which represents fuel carried and rate of fuel usage of the vehicle. Wherein the planning graph for the vehicle represents one or more physical constraints or performance constraints of the vehicle, performing an optimization to identify a path in the resulting planning graph may include performing the optimization to identify a path in the resulting planning graph which represents the physical or performance constraints of the vehicle.

Where at least one object in the environment is a dynamic object and the planning graph for the vehicle represents one or more physical constraints or performance constraints of the dynamic object, performing an optimization to identify a path in the resulting planning graph may include performing the optimization to identify a path in the resulting planning graph which represents the physical or performance constraints of the dynamic object.

Setting a probability of collision for each of two or more edges of the planning graph based at least in part on the collision assessment may include: for each of a number of edges of the planning graph that has a respective probability of a collision with one or more objects in the environment below a defined threshold probability of a collision, assigning a weight with a value equal to or greater than zero, and for each of a number of edges of the planning graph with a respective probability of a collision with one or more objects in the environment above the defined threshold probability of a collision, assigning a weight with a value less than zero. Assigning a weight with a value less than zero may include assigning a negative weight with a magnitude that corresponds with the respective probability of a collision.

Where there is at least one dynamic object in the environment, setting a probability of collision for each of two or more edges of the planning graph based at least in part on the collision assessment may include: for each of a number of edges of the planning graph that has a respective probability of a collision with the at least one dynamic object in the environment below a defined threshold probability of a collision, assigning a weight with a value equal to or greater than zero, and for each of a number of edges of the planning graph with a respective probability of a collision with the at least one dynamic object in the environment above the defined threshold probability of a collision, assigning a weight with a value less than zero.

Assigning a weight with a value less than zero may include assigning a negative weight with a magnitude that corresponds with the respective probability of a collision with the at least one dynamic object and wherein performing an optimization to identify a path in the resulting planning graph with a relatively high potential of a collision with one or more objects in the environment in which the vehicle operates includes performing a shortest path algorithm for traversing the planning graph based on the assigned weights for each of the number of edges of the planning graph.

Where there is at least one static object in the environment, setting a probability of collision for each of two or more edges of the planning graph based at least in part on the collision assessment may include: for each of a number of edges of the planning graph that has a respective probability of a collision with the at least one static object in the environment assigning a weight with a value of infinity.

Receiving perception information may include receiving perception information that represents a position and a trajectory of at least one dynamic object in the environment. Receiving perception information may include receiving perception information at a motion planner, the perception information collected via one or more sensors that are carried by the vehicle.

The method may further include: identifying, by an object detector, at least a first dynamic object in the environment from the perception information collected via the one or more sensors. The method may further include: providing a volumetric representation of at least one dynamic object in the environment to the motion planner. The method may further include: providing a current trajectory of at least one dynamic object in the environment to the motion planner. The method may further include: providing a predicted trajectory of at least one dynamic object in the environment to the motion planner.

The method may further include: determining at least one predicted trajectory of at least one dynamic object based on an anticipated response of the at least one dynamic object to a proposed and not yet performed modified trajectory in the vehicle based on the anticipated response to the modified trajectory of the vehicle.

The method may further include: during a current runtime execution, comparing the perception information to a set of information corresponding to volumetric representations of 3D space swept by the vehicle when making transitions, represented by edges of the planning graph, from one state to another state, the information corresponding to volumetric representations of 3D space swept by the vehicle when making transitions, represented by edges of the planning graph, from one state to another state which was stored in one or more nontransitory processor-readable media before the current runtime execution, via a hardware processor.

The method may further include: performing a collision assessment on each of two or more of the edges of a new planning graph; for each of two or more edges of the new planning graph, setting a probability of collision based at least in part on the collision assessment; performing an optimization to identify a path in the resulting new planning graph with a relatively high potential of a collision with one or more objects in the environment in which the vehicle operates; and implementing a motion plan with the relatively high potential of a collision with one or more objects in the environment in which the vehicle operates based at least in part on the optimization.

Performing the collision assessment on the each of two or more of the edges of the resulting planning graph may include performing in parallel the collision assessment on the each of two or more of the edges of the planning graph. Performing the collision assessment on the each of two or more of the edges of the resulting planning graph may include performing the collision assessment for all voxels or boxes of at least one of the one or more objects in the environment with respect to one voxel or box of at least one of the two or more edges at a time.

A processor-based system to determine paths for vehicles via planning graphs is described. Each planning graph may respectively comprise a plurality of nodes connected by edges, each node which represents, implicitly or explicitly, time and variables that characterize a state of the vehicle that operates in an environment, and each edge representing a transition between a respective pair of nodes. The system may be summarized as including: at least one processor; and at least one nontransitory processor-readable medium that stores at least one of processor-executable instructions or data which, when executed by the at least one processor, causes the at least one processor to: receive perception information that represents the environment in which the vehicle operates; perform a collision assessment on each of two or more of the edges of a planning graph; for each of two or more edges of the planning graph, set a probability of collision based at least in part on the collision assessment; perform an optimization to identify a path in the resulting planning graph with a relatively high potential of a collision with one or more objects in the environment in which the vehicle operates; and implement a motion plan with the relatively high potential of a collision with one or more objects in the environment in which the vehicle operates based at least in part on the optimization.

The at least one of processor-executable instructions or data, when executed by the at least one processor, further causes the at least one processor to perform any of the above described methods or acts.

A method of operation in a processor-based system to determine paths for vehicles via planning graphs is described. Each planning graph may respectively include a plurality of nodes connected by edges, each node which represents, implicitly or explicitly, time and variables that characterize a state of the vehicle that operates in an environment, and each edge representing a transition between a respective pair of nodes. The method may be summarized as including: based on at least on part on an assessment of probability of a collision with one or more dynamic objects in the environment in which the vehicle operates, for a planning graph: assigning a weight with a value equal to or greater than zero to each edge of the planning graph if the respective edge has a relatively low respective probability of a collision with one or more dynamic objects in the environment; assigning a weight with a value less than zero to each of edge of the planning graph if the respective edge has a relatively high respective probability of a collision with one or more dynamic objects in the environment; and performing an optimization to identify a path in the resulting planning graph with a relatively high potential of a collision with one or more objects in the environment in which the vehicle operates.

Assigning a weight with a value equal to or greater than zero to each edge of the planning graph if the respective edge has a relatively low respective probability of a collision with one or more dynamic objects in the environment may include assigning a weight with a value equal to or greater than zero to each edge of the planning graph if the respective edge has a respective probability of a collision with one or more dynamic objects in the environment that is below a threshold greater than zero; and assigning a weight with a value less than zero to each edge of the planning graph if the respective edge has a relatively high respective probability of a collision with one or more dynamic objects in the environment includes assigning a weight with a value less than zero to each of edge of the planning graph if the respective edge has a respective probability of a collision with one or more dynamic objects in the environment that is above the threshold. Assigning a weight with a value less than may zero include assigning a negative weight with a magnitude that is proportional to the respective probability of a collision.

Where there is at least one static object in the environment, the method may further include based on an assessment of probability of a collision with one or more dynamic objects in the environment in which the vehicle operates, for a planning graph: assigning a weight with a value of infinity to each edge of the planning graph that has a respective non-zero probability of a collision with the at least one static object in the environment.

Performing an optimization to identify a path in the resulting planning graph with a relatively high potential of a collision with one or more objects in the environment in which the vehicle operates may include performing an optimization to identify a path in the resulting planning graph with a highest potential of a collision with the one or more dynamic objects in the environment in which the vehicle operates. Performing an optimization to identify a path in the resulting planning graph with a relatively high potential of a collision with one or more objects in the environment in which the vehicle operates may include performing an optimization to identify a path in the resulting planning graph with a highest potential of a collision with one or more dynamic objects in the environment in which the vehicle operates over an entire operational range of the vehicle. Performing an optimization to identify a path in the resulting planning graph with a relatively high potential of a collision with one or more objects in the environment in which the vehicle operates may include performing an optimization to identify a path in the resulting planning graph with a longest duration without a collision with one or more static objects in the environment in which the vehicle operates.

Assigning a weight based at least in part on the collision assessment may include assigning the weight based at least in part on a current trajectory of the dynamic object. Assigning a weight based at least in part on the collision assessment may include assigning the weight based at least in part on a change in a trajectory of the dynamic object. Assigning a weight based at least in part on the collision assessment may include assigning the weight based at least in part on a predicted trajectory of the dynamic object. Assigning a weight based at least in part on the collision assessment may include assigning the weight based at least in part on a predicted trajectory of the dynamic object, the predicted trajectory that is in turn based at least in part on an anticipated reaction to by the dynamic object to an already changed trajectory of the vehicle. Assigning a weight based at least in part on the collision assessment may include assigning the weight based at least in part on a predicted trajectory of the dynamic object, the predicted trajectory that is in turn based at least in part on an anticipated reaction by the dynamic object to a yet to be implemented change in a trajectory of the vehicle via a feedforward network.

The planning graph for the vehicle may be a multi-dimensional graph that represents both a position and a velocity of the vehicle, and performing an optimization to identify a path in the resulting planning graph may include performing the optimization to identify a path in the resulting planning graph which represents the position and the velocity of the vehicle. Where the velocity represents both a speed and a direction of the vehicle, performing an optimization to identify a path in the resulting planning graph may include performing the optimization to identify a path in the resulting planning graph which represents the speed and the direction of the vehicle. Where the direction represents a pitch, a roll, and a yaw of the vehicle, performing an optimization to identify a path in the resulting planning graph may include performing the optimization to identify a path in the resulting planning graph which represents the pitch, the roll and the yaw of the vehicle. Where the planning graph for the vehicle represents an acceleration of the vehicle, performing an optimization to identify a path in the resulting planning graph may include performing the optimization to identify a path in the resulting planning graph which represents the acceleration of the vehicle. Where the planning graph for the vehicle represents a maximum time or distance of travel obtainable by the vehicle, performing an optimization to identify a path in the resulting planning graph may include performing the optimization to identify a path in the resulting planning graph which represents the maximum time or distance of travel obtainable by the vehicle. Where the planning graph for the vehicle represents an amount of fuel carried by the vehicle and a rate of fuel usage, performing an optimization to identify a path in the resulting planning graph may include performing the optimization to identify a path in the resulting planning graph which represents fuel carried and rate of fuel usage of the vehicle. Where the planning graph for the vehicle represents one or more physical constraints or performance constraints of the vehicle, perform an optimization to identify a path in the resulting planning graph may include performing the optimization to identify a path in the resulting planning graph which represents the physical or performance constraints of the vehicle. Where the planning graph for the vehicle represents one or more physical constraints or performance constraints of the dynamic object, performing an optimization to identify a path in the resulting planning graph may include performing the optimization to identify a path in the resulting planning graph which represents the physical or performance constraints of the dynamic object.

The method may further include: receiving perception information that represents at least a position and a trajectory of at least one dynamic object in the environment. Receiving perception information may include receiving perception information at a motion planner, the perception information collected via one or more sensors that are carried by the vehicle.

The method may further include: identifying, by an object detector, at least a first dynamic object in the environment from the perception information collected via the one or more sensors.

The method may further include: providing a volumetric representation of at least one dynamic object in the environment to the motion planner.

The method may further include: providing a current trajectory of at least one dynamic object in the environment to the motion planner.

The method may further include: providing a predicted trajectory of at least one dynamic object in the environment to the motion planner.

The method may further include: determining at least one predicted trajectory of at least one dynamic object based on a proposed and not yet implemented modified trajectory in the vehicle.

The method may further include: during a current runtime execution, comparing the perception information to a set of information corresponding to volumetric representations of 3D space swept by the vehicle when making transitions, represented by edges of the planning graph, from one state to another state, the information corresponding to volumetric representations of 3D space swept by the vehicle when making transitions, represented by edges of the planning graph, from one state to another state which was stored in one or more nontransitory processor-readable media before the current runtime execution, via a hardware processor.

A processor-based system to determine paths for vehicles via planning graphs is described. Each planning graph may respectively include a plurality of nodes connected by edges, each node which represents, implicitly or explicitly, time and variables that characterize at least one or both of: i) a state of the vehicle or ii) an environment in which the vehicle operates, and each edge representing a transition between a respective pair of nodes. The system may be summarized as including: at least one processor; and at least one nontransitory processor-readable medium that stores at least one of processor-executable instructions or data which, when executed by the at least one processor, causes the at least one processor to: based at least in part on an assessment of probability of a collision with one or more dynamic objects in the environment in which the vehicle operates, for a planning graph: assign a weight with a value equal to or greater than zero to each edge of the planning graph if the respective edge has a relatively low respective probability of a collision with one or more dynamic objects in the environment; assign a weight with a value less than zero to each of edge of the planning graph if the respective edge has a relatively high respective probability of a collision with one or more dynamic objects in the environment; and perform an optimization to identify a path in the resulting planning graph with a relatively high potential of a collision with one or more objects in the environment in which the vehicle operates.

The at least one of processor-executable instructions or data, when executed by the at least one processor, further causes the at least one processor to perform any of the above described methods or acts.

A method of operation in a processor-based system to determine paths for vehicles via planning graphs is described. Each planning graph may respectively include a plurality of nodes connected by edges, each node which represents, implicitly or explicitly, time and variables that characterize a state of the vehicle which operates in an environment and which environment includes one or more dynamic objects, and each edge represents a transition between a respective pair of nodes. The method may be summarized as including: receiving perception information that represents the environment in which the vehicle operates; performing a collision assessment on each of two or more of the edges of a planning graph; for each of two or more edges of the planning graph, setting a probability of collision based at least in part on the collision assessment; performing an optimization to identify a path in the resulting planning graph that provides a longest route of travel of the vehicle in two-dimensional or three-dimensional space as specified by the path with a relatively low potential of a collision with one or more dynamic objects in the environment in which the vehicle operates; and implementing a motion plan with the relatively low potential of a collision with one or more dynamic objects in the environment in which the vehicle operates based at least in part on the optimization.

Performing an optimization to identify a longest path in the resulting planning graph with a relatively low potential of a collision with one or more objects in the environment in which the vehicle operates may include performing an optimization to identify a longest route represented by a path in the resulting planning graph with a lowest potential of a collision with one or more objects in the environment in which the vehicle operates. Performing an optimization to identify a path in the resulting planning graph that provides a longest route of the vehicle in two-dimensional or three-dimensional space as specified by the path with a relatively low potential of a collision with one or more objects in the environment in which the vehicle operates may include performing an optimization to identify a path in the resulting planning graph to identify a longest route of the vehicle in two-dimensional or three-dimensional space as specified by the path with a lowest potential of a collision with one or more objects in the environment in which the vehicle operates along a length of the route, the length of the route defined at least in part by when the one or more objects runs out of a particular resource.

Setting a probability of collision for each of two or more edges of the planning graph based at least in part on the collision assessment may include setting a probability of collision for each of two or more edges of the planning graph based at least in part on a current trajectory of the dynamic object. Setting a probability of collision for each of two or more edges of the planning graph based at least in part on the collision assessment may include setting a probability of collision for each of two or more edges of the planning graph based at least in part on a change in a trajectory of the dynamic object. Setting a probability of collision for each of two or more edges of the planning graph based at least in part on the collision assessment may include setting a probability of collision for each of two or more edges of the planning graph based at least in part on a predicted trajectory of the dynamic object. Setting a probability of collision for each of two or more edges of the planning graph based at least in part on the collision assessment may include setting a probability of collision for each of two or more edges of the planning graph based at least in part on a predicted trajectory of the dynamic object that is based at least in part on a change in a trajectory of the vehicle.

Where the planning graph for the vehicle is a multi-dimensional graph that represents both a position and a velocity of the vehicle, performing an optimization to identify a path in the resulting planning graph may include performing the optimization to identify a path in the resulting planning graph which represents the position and the velocity of the vehicle. Where the velocity represents both a speed and a direction (heading) of the vehicle, performing an optimization to identify a path in the resulting planning graph may include performing the optimization to identify a path in the resulting planning graph which represents the speed and the direction of the vehicle. Where the direction represents a pitch, a roll, and a yaw of the vehicle, performing an optimization to identify a path in the resulting planning graph may include performing the optimization to identify a path in the resulting planning graph which represents the pitch, the roll and the yaw of the vehicle. Where the planning graph for the vehicle represents an acceleration of the vehicle, perform an optimization to identify a path in the resulting planning graph may include performing the optimization to identify a path in the resulting planning graph which represents the acceleration of the vehicle. Where the planning graph for the vehicle represents a maximum time or distance of travel obtainable by the vehicle, performing an optimization to identify a path in the resulting planning graph may include performing the optimization to identify a path in the resulting planning graph which represents the maximum time or distance of travel obtainable by the vehicle. Performing an optimization on the resulting planning graph may include performing a shortest path algorithm for traversing the planning graph based on assigned weights to edges of the planning graph. Where the planning graph for the vehicle represents one or more physical constraints or performance constraints of the vehicle, performing an optimization to identify a path in the resulting planning graph may include performing the optimization to identify a path in the resulting planning graph which represents the physical or performance constraints of the vehicle. Where the planning graph for the vehicle represents one or more physical constraints or performance constraints of the dynamic object, performing an optimization to identify a path in the resulting planning graph may include performing the optimization to identify a path in the resulting planning graph which represents the physical or performance constraints of the dynamic object.

Where there is at least one static object in the environment, the method may further include: for each of a number of edges of the planning graph that has a respective probability of a collision with the at least one static object in the environment assigning a weight with a value of infinity, and wherein performing an optimization to identify a path in the resulting planning graph includes performing an optimization to identify a path in the resulting planning graph to identify a longest route of travel of the vehicle in two-dimensional or three-dimensional space as specified by the path with a relatively low potential of a collision with one or more static objects in the environment in which the vehicle operates.

Receiving perception information includes receiving perception information that represents a position and a trajectory of at least one dynamic object in the environment. Receiving perception information includes receiving perception information at a motion planner, the perception information collected via one or more sensors that are carried by the vehicle.

The method may further include: identifying, by an object detector, at least a first dynamic object in the environment from the perception information collected via the one or more sensors.

The method may further include: providing a volumetric representation of at least one dynamic object in the environment to the motion planner.

The method may further include: providing a current trajectory of at least one dynamic object in the environment to the motion planner.

The method may further include: providing a predicted trajectory of at least one dynamic object in the environment to the motion planner.

The method may further include: determining at least one predicted trajectory of at least one dynamic object based on an anticipated response of the at least one dynamic object to a proposed and not yet implemented modified trajectory in the vehicle.

The method may further include: during a current runtime execution, comparing the perception information to a set of information corresponding to volumetric representations of 3D space swept by the vehicle when making transitions, represented by edges of the planning graph, from one state to another state, the information corresponding to volumetric representations of 3D space swept by the vehicle when making transitions, represented by edges of the planning graph, from one state to another state which was stored in one or more nontransitory processor-readable media before the current runtime execution, via a hardware processor.

A processor-based system to determine paths for vehicles via planning graphs is described. Each planning graph may respectively include a plurality of nodes connected by edges, each node which represents, implicitly or explicitly, time and variables that characterize a state of the vehicle that operates in an environment, and each edge representing a transition between a respective pair of nodes. The system may be summarized as including: at least one processor; and at least one nontransitory processor-readable medium that stores at least one of processor-executable instructions or data which, when executed by the at least one processor, causes the at least one processor to: receive perception information that represents the environment in which the vehicle operates; perform a collision assessment on each of two or more of the edges of a planning graph; for each of two or more edges of the planning graph, set a probability of collision based at least in part on the collision assessment; perform an optimization to identify a path in the resulting planning graph that provides a longest route of travel of the vehicle in two-dimensional or three-dimensional space as specified by the path with a relatively low potential of a collision with one or more dynamic objects in the environment in which the vehicle operates; and implement a motion plan with the relatively low potential of a collision with one or more dynamic objects in the environment in which the vehicle operates based at least in part on the optimization.

The at least one of processor-executable instructions or data, when executed by the at least one processor, may further cause the at least one processor to perform any of the above described methods or acts.

A method of operation in a processor-based system to determine paths for vehicles via planning graphs is described. Each planning graph may respectively include a plurality of nodes connected by edges, each node which represents, implicitly or explicitly, time and variables that characterize a state of the vehicle that operates in an environment, the environment which includes one or more dynamic objects, and each edge represents a transition between a respective pair of nodes. The method may be summarized as including: receiving perception information that represents the environment in which the vehicle operates; setting a probability of collision for each of two or more edges of the planning graph based at least in part on a predicted trajectory of the dynamic object that is based at least in part on a planned and not yet implemented change in a trajectory of the vehicle; performing a collision assessment on each of two or more of the edges of the planning graph; for each of two or more edges of the planning graph, setting a probability of collision based at least in part on the collision assessment; performing an optimization to identify a path in the resulting planning graph with a relatively low potential of a collision with one or more dynamic objects in the environment in which the vehicle operates; and implementing a motion plan with the relatively low potential of a collision with one or more dynamic objects in the environment in which the vehicle operates based at least in part on the optimization.

Performing an optimization to identify a path in the resulting planning graph with a relatively low potential of a collision with one or more objects in the environment in which the vehicle operates may include performing an optimization to identify a path in the resulting planning graph with a lowest potential of a collision with the one or more dynamic objects in the environment in which the vehicle operates. Performing an optimization to identify a path in the resulting planning graph with a relatively low potential of a collision with one or more objects in the environment in which the vehicle operates may include performing an optimization to identify a path in the resulting planning graph with a lowest potential of a collision with one or more dynamic objects in the environment in which the vehicle operates over an entire operational range of the vehicle. Performing an optimization to identify a path in the resulting planning graph with a relatively low potential of a collision with one or more objects in the environment in which the vehicle operates may include performing an optimization to identify a path in the resulting planning graph that provides a longest route of travel of the vehicle in two-dimensional or three-dimensional space as specified by the path without a collision with one or more dynamic objects and one or more static objects in the environment in which the vehicle operates. Where the planning graph for the vehicle is a multi-dimensional graph that represents both a position and a velocity of the vehicle, performing an optimization to identify a path in the resulting planning graph may include performing the optimization to identify a path in the resulting planning graph which represents the position and the velocity of the vehicle. Where the velocity represents both a speed and a direction of the vehicle, performing an optimization to identify a path in the resulting planning graph may include performing the optimization to identify a path in the resulting planning graph which represents the speed and the direction of the vehicle. Where the direction represents a pitch, a roll, and a yaw of the vehicle, performing an optimization to identify a path in the resulting planning graph may include performing the optimization to identify a path in the resulting planning graph which represents the pitch, the roll and the yaw of the vehicle. Where the planning graph for the vehicle represents an acceleration of the vehicle, performing an optimization to identify a path in the resulting planning graph may include performing the optimization to identify a path in the resulting planning graph which represents the acceleration of the vehicle. Where the planning graph for the vehicle represents a maximum time or distance of travel obtainable by the vehicle, performing an optimization to identify a path in the resulting planning graph may include performing the optimization to identify a path in the resulting planning graph which represents the maximum time or distance of travel obtainable by the vehicle. Where the planning graph for the vehicle represents an amount of fuel carried by the vehicle and a rate of fuel usage, performing an optimization to identify a path in the resulting planning graph may include performing the optimization to identify a path in the resulting planning graph which represents fuel carried and rate of fuel usage of the vehicle. Where the planning graph for the vehicle represents one or more physical constraints or performance constraints of the vehicle, performing an optimization to identify a path in the resulting planning graph may include performing the optimization to identify a path in the resulting planning graph which represents the physical or performance constraints of the vehicle. Where the planning graph for the vehicle represents one or more physical constraints or performance constraints of the dynamic object, performing an optimization to identify a path in the resulting planning graph may include performing the optimization to identify a path in the resulting planning graph which represents the physical or performance constraints of the dynamic object.

The method may further include: receiving perception information that represents at least a position and a trajectory of at least one dynamic object in the environment. Receiving perception information may include receiving perception information at a motion planner, the perception information collected via one or more sensors that are carried by the vehicle.

The method may further include: identifying, by an object detector, at least a first dynamic object in the environment from the perception information collected via the one or more sensors.

The method may further include: providing a volumetric representation of at least one dynamic object in the environment to the motion planner.

The method may further include: providing a current trajectory of at least one dynamic object in the environment to the motion planner.

The method may further include: providing a predicted trajectory of at least one dynamic object in the environment to the motion planner.

The method may further include: determining at least one predicted trajectory of at least one dynamic object based on a proposed and not yet implemented modified trajectory in the vehicle.

The method may further include: during a current runtime execution, comparing the perception information to a set of information corresponding to volumetric representations of 3D space swept by the vehicle when making transitions, represented by edges of the planning graph, from one state to another state, the information corresponding to volumetric representations of 3D space swept by the vehicle when making transitions, represented by edges of the planning graph, from one state to another state which was stored in one or more nontransitory processor-readable media before the current runtime execution, via a hardware processor.

A processor-based system to determine paths for vehicles via planning graphs is described. Each planning graph may respectively include a plurality of nodes connected by edges, each node which represents, implicitly or explicitly, time and variables that characterize a state of the vehicle that operates in an environment, and each edge representing a transition between a respective pair of nodes. The system may be summarized as including: at least one processor; and at least one nontransitory processor-readable medium that stores at least one of processor-executable instructions or data which, when executed by the at least one processor, causes the at least one processor to: receive perception information that represents the environment in which the vehicle operates; set a probability of collision for each of two or more edges of the planning graph based at least in part on a predicted trajectory of the dynamic object that is based at least in part on a planned and not yet implemented change in a trajectory of the vehicle; perform a collision assessment on each of two or more of the edges of a planning graph; for each of two or more edges of the planning graph, set a probability of collision based at least in part on the collision assessment; perform an optimization to identify a path in the resulting planning graph with a relatively low potential of a collision with one or more dynamic objects in the environment in which the vehicle operates; and implement a motion plan with the relatively low potential of a collision with one or more dynamic objects in the environment in which the vehicle operates based at least in part on the optimization.

The at least one of processor-executable instructions or data, when executed by the at least one processor, may further cause the at least one processor to perform any of the above described methods or acts.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and construction of an occupancy grid and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
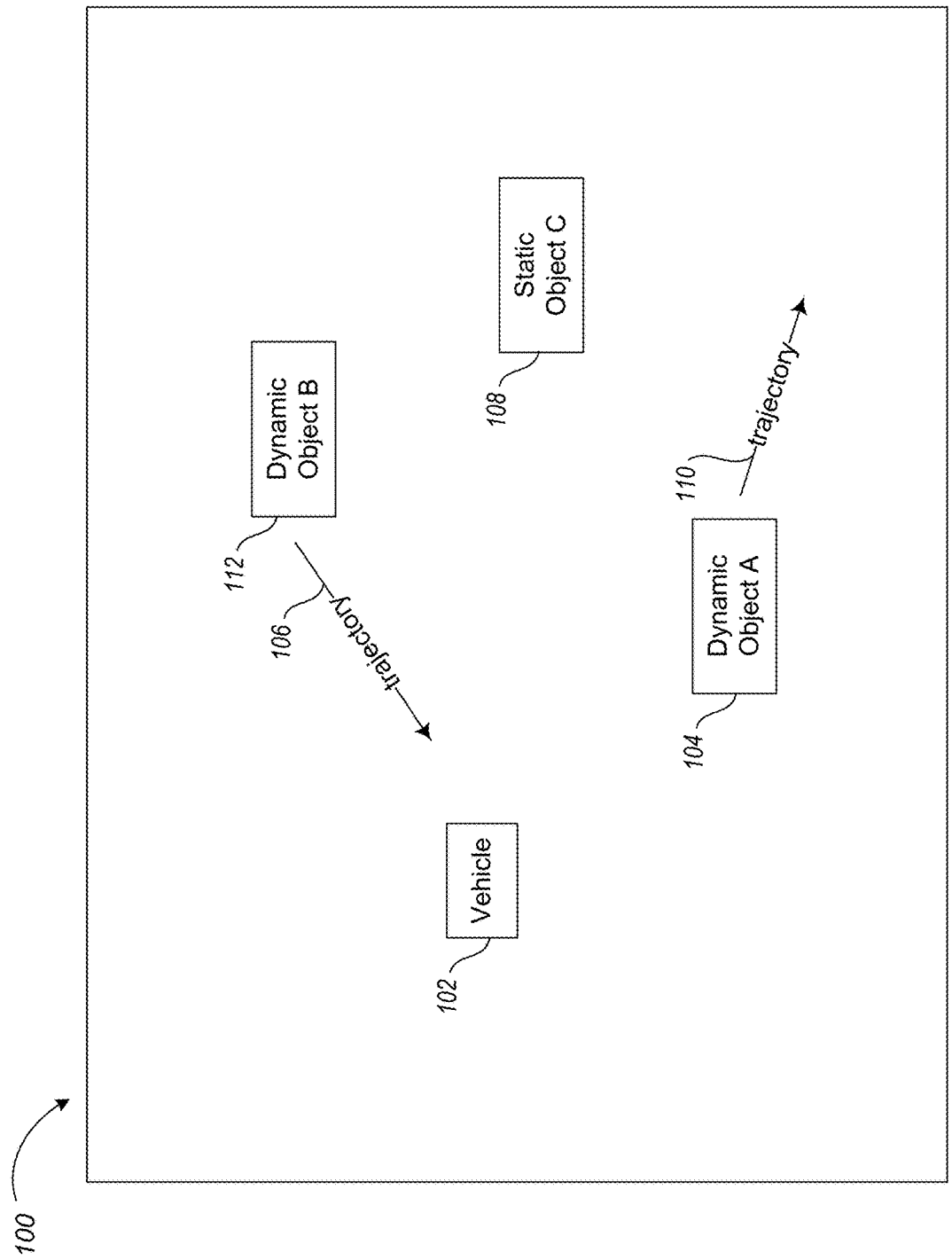
FIG. 1 is a schematic view of an environment in which an autonomous vehicle may operate, according to one illustrated embodiment.

FIG. 1 shows a dynamic operational environment 100 in which an autonomous vehicle 102 may operate, according to one illustrated embodiment. For the sake of brevity, the dynamic operational environment 100 is referred to herein as the environment. The environment represents a two-dimensional or three-dimensional space in which the vehicle 102 may operate and move. The vehicle 102 may be an automobile, airplane, drone, robot or any other vehicle that can operate autonomously or semi-autonomously (i.e., at least partially autonomously) and move along routes or paths in the space represented by the environment 100. The environment 100 is the two- or three-dimensional space in which the vehicle operates and is different than the vehicle's "configuration space" (often called "C-space") referenced below with respect to the motion planning graphs of FIGS. 4A through 5B and as explained in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," which is hereby incorporated by reference in its entirety and in International Patent Application Publication No. WO 2016/122840, filed Jan. 5, 2016, entitled "SPECIALIZED ROBOT MOTION PLANNING HARDWARE AND METHODS OF MAKING AND USING SAME," which is also hereby incorporated by reference in its entirety. The configuration space is typically many dimensional (i.e., greater than 3 dimensions). Referring to FIG. 1, the environment 100 can include obstacle collision regions. These obstacle collision regions may be due to static objects (e.g., buildings, trees, rocks, etc.) or dynamic objects (e.g., other aerial or ground-based vehicles, people, animals, rolling rocks, birds, etc.) in the environment 100. For example, static object C 108 represents an object that does not move in the environment 100 and creates a collision region in the environment 100 such that it is possible for vehicle 102 to collide with static object C 108 if they attempt to occupy the same space within the environment 100 at the same time. In various embodiments, there may be fewer or additional static objects that that shown in FIG. 1.

In addition to the static objects, dynamic objects may also be present, including those representing objects that move in known/certain trajectories (e.g., a falling brick, a rolling can), those that are controlled by a conscious being (e.g., a bicyclist, pedestrian, a driver, a pilot, a bird, etc.) and those that are controlled by other autonomous systems, such as in the case of other autonomous vehicles or robots. Challenges to motion planning due to these dynamic objects involve the ability to perform motion planning at very fast speeds and the ability to analyze the uncertainty of how dynamic objects may move. The environment 100 surrounding the vehicle 102 can change rapidly, and it is advantageous for the vehicle 102 to perform motion planning to keep up with those changes. For example, as shown in FIG. 1, dynamic object A 104 is currently moving along a trajectory 110 away from the vehicle 102. However, there may be instances where it is desirable for vehicle 102 to follow or intercept dynamic object A 104, such as to inspect dynamic object A 104, collect information from dynamic object A 104, exchange information with dynamic object A 104, or even collide with dynamic object A 104 in a game.

Conversely, as shown in FIG. 1, dynamic object B 112 is currently moving along a trajectory 106 toward vehicle 102. There may be instances where it is desirable for vehicle 102 to avoid collision with or avoid getting near dynamic object B 112, such as to arrive at a goal destination without collision, avoid damage by such a collision, or to evade contact with dynamic object B 112, for instance in a game. In one embodiment, the goal of vehicle 102 is to maximize the time without a collision with dynamic object B 112 such that, for example, dynamic object B 112 runs out of fuel before colliding with the vehicle 102. The goal of vehicle 102 in one example embodiment is to minimize the probability of collision with dynamic object B 112 between the current time and time of arrival of the vehicle 102 at a desired destination or achieving a particular goal, or between the current time and when dynamic object B 112 runs out of fuel. There may be fewer or additional dynamic objects in the environment 100 than that shown in FIG. 1. Also, the environment may in some instances have a boundary corresponding to the range of vehicle 102, which may depend at least in part of the current fuel or energy available to vehicle 102.

While FIG. 1 illustrates a representative environment 100, typical environments may include many additional objects and entities, including objects that correspond to other manned and autonomous vehicles and various other natural or artificial static and dynamic objects and obstacles. The concepts taught herein may be employed in a similar fashion with more populated environment than that illustrated.

Figure 2:
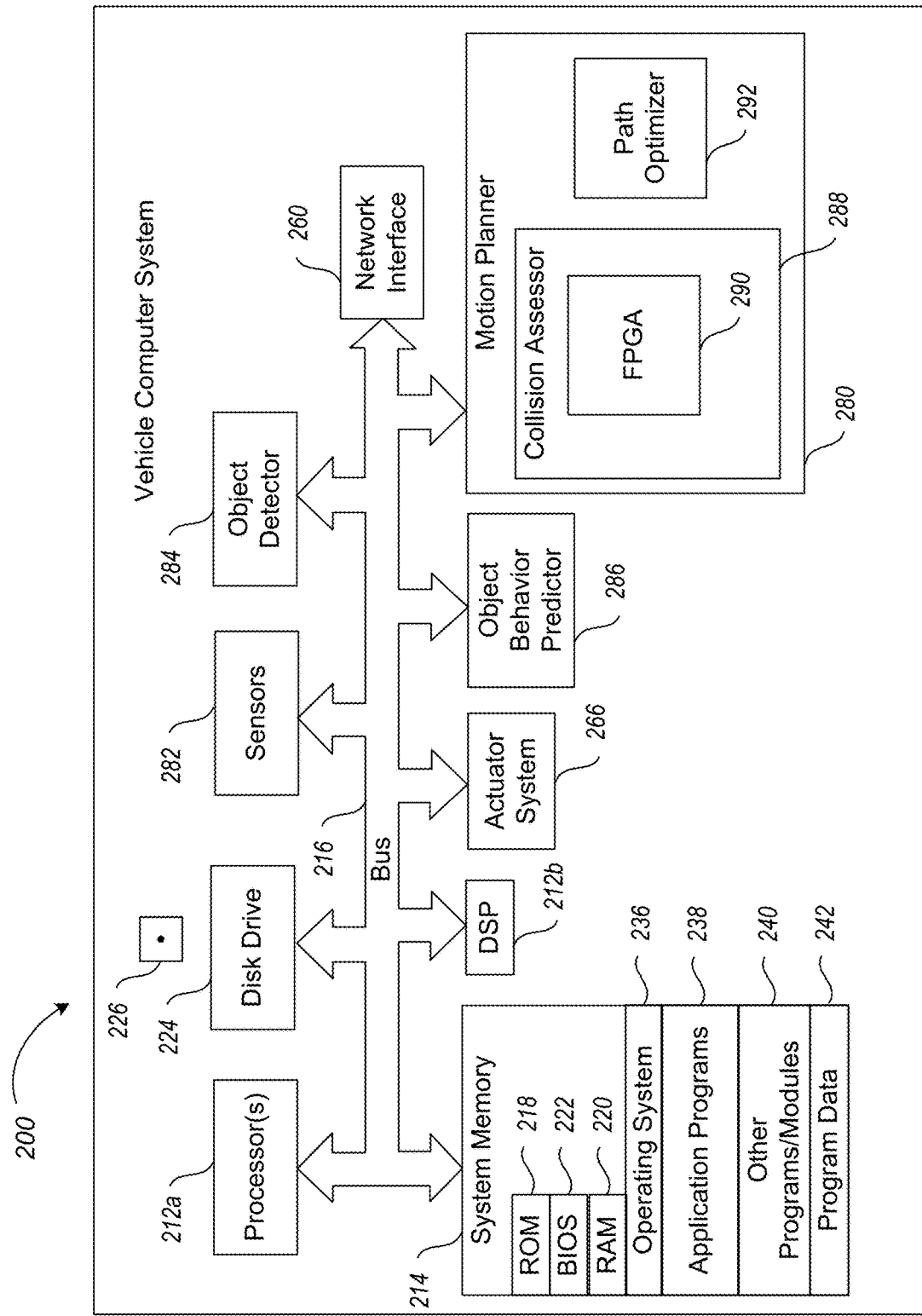
FIG. 2 is a functional block diagram of a computer system of a vehicle that may operate in the environment of FIG. 1, according to one illustrated embodiment.

FIG. 2 and the following discussion provide a brief, general description of a suitable vehicle computer system 200 in which the various illustrated motion planning systems and methods might be implemented.

Although not required, many of the embodiments will be described in the general context of computer-executable instructions, such as program application modules, objects, or macros stored on computer- or processor-readable media and executed by a computer or processor and specialized vehicle motion planning hardware that can perform collision assessments and motion planning operations. Such motion planning operations may include performing a collision assessment on edges of a planning graph, determining and setting a probability of collision, performing an optimization to identify a path in the planning graph to either avoid collision or cause collision with an object in the environment by finding a shortest path within the planning graph and implementing such a motion plan.

When representing an object, either a vehicle (e.g., an autonomous vehicle or robot) or an object in the environment (e.g., a static or dynamic obstacle), one may represent their surfaces as either voxels (3D pixels) or meshes of polygons (often triangles). Each discretized region of space is termed a "voxel," equivalent to a 3D (volumetric) pixel. In some cases, it is advantageous to represent the objects instead as boxes (rectangular prisms). Due to the fact that objects are not randomly shaped, there may be a significant amount of structure in how the voxels are organized; many voxels in an object are right next to each other in 3D space. Thus, representing objects as boxes may require far fewer bits (i.e., may require just the x, y, z coordinates for two opposite corners of the box). Also, doing intersection tests for boxes is comparable in complexity to doing so for voxels.

In one embodiment, the collision assessment is performed by first streaming in all of the dynamic object voxels (or boxes) onto a processor. Then the edge information for each edge of the roadmap for the vehicle 102 is streamed from memory devoted to the roadmap. Each edge has some number of voxels (or boxes) corresponding to the volume in 3D space swept by the vehicle 102 when making the transition in the roadmap from one state to another state represented by that edge. Those voxels or boxes swept by the vehicle 102 when making the transition in the roadmap from one state to another state represented by that edge are stored in memory for each edge of the roadmap. For each edge voxel (or box), when it is streamed in from the swept volume of an edge, if it collides with any of the obstacle voxels (or boxes), the system 200 determines a collision with that edge in the roadmap. For example, when an edge voxel is streamed in from the swept volume of edge x of the roadmap, if it collides with any of the obstacle voxels (or boxes), the system notes a collision with edge x. This embodiment improves on the technology of collision assessment because it enables much larger roadmaps to be used in the collision assessment as compared to other designs in which the collision assessment is performed in parallel on all the edges of the planning graph. In particular, this helps overcome the disadvantage of other designs with respect to a limited amount of roadmap information that could be stored on chip circuitry. However, using the collision assessment method described herein, on-chip storage is often more than sufficient for storing all the obstacle boxes (although may be less so with using voxels). This provides the ability to store large roadmaps and/or multiple roadmaps in less expensive, off-chip storage, e.g., dynamic random access memory (DRAM).

In various embodiments, such operations may be performed entirely in hardware circuitry or as software stored in a memory storage, such as system memory 214, and executed by one or more hardware processors 212a, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EEPROMs), or as a combination of hardware circuitry and software stored in the memory storage. For example, performing the optimization to identify a path in the planning graph to either avoid collision or cause collision with an object in the environment by finding a shortest path within the planning graph may be performed by optimizer 292. In one example embodiment, when the path optimizer 292 is implemented with hardware, the topology of the planning graph may also be mapped onto a reconfigurable fabric of hardware units to enable rapid determination of the shortest path. This mapping involves programming each physical node with the addresses and edge weights of its logical neighbors. This allows the architecture to be reconfigurable to different planning graph topologies. Other implementations may use a mini-processor implemented on an FPGA.

In an alternative embodiment, the collision assessment may be performed in parallel on each of the edges of a resulting planning graph for the vehicle 102 by specialized motion planning hardware, such as the reconfigurable collision detection architecture and other embodiments described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS" and in International Patent Application Publication No. WO 2016/122840, filed Jan. 5, 2016, entitled "SPECIALIZED ROBOT MOTION PLANNING HARDWARE AND METHODS OF MAKING AND USING SAME." For example, all or part of such specialized motion planning hardware may be incorporated in or form part of the motion planner 280 and collision assessor 288. Also, implementation of various relevant aspects of perception, planning graph construction, collision detection, and path search are also described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," and in International Patent Application Publication No. WO 2016/122840, filed Jan. 5, 2016, entitled "SPECIALIZED ROBOT MOTION PLANNING HARDWARE AND METHODS OF MAKING AND USING SAME." Those skilled in the relevant art will appreciate that the illustrated embodiments, as well as other embodiments, can be practiced with other system configurations and/or other computing system configurations, including those of robots, hand-held devices, multiprocessor systems, microprocessor-based or programmable consumer electronics, personal computers ("PCs"), networked PCs, mini computers, mainframe computers, and the like. The embodiments or portions thereof (e.g., at design time, configuration time, pre-runtime) can be practiced in distributed computing environments where tasks or modules are performed by remote processing devices, which are linked through a communications network. In a distributed computing environment, program modules may be located in both local and remote memory storage devices or media. However, having efficient compute capability for the vehicle 102 is important to allow the vehicle 102 to respond in real time to changing environments. Commonly deployed solutions to this problem fail on both the performance and power fronts. They are too slow to allow high degree-of-freedom vehicles and robots to respond in real time to the environment, and burden the system with powering several CPUs or GPUs. To solve this problem, the vehicle computer system 200 shown in the example embodiment of FIG. 2 includes a motion planner 280 having a collision assessor 288 on board the vehicle 102 that uses collision detection microarchitecture that is fully retargetable, such as FPGA 290. However, other programmable collision detection microarchitectures that include an array of programmable logic blocks and a hierarchy of reconfigurable interconnects may be used in various alternative embodiments, such as an ASIC architecture. Through a programming phase, the collision detection microarchitecture may be applied to any vehicle planning problem. The collision assessor 288 uses FPGA 290 to leverage precomputation to both construct a motion planning roadmap for vehicle system 200 and exhaustively perform collision checking ahead of time. This collision checking may be to achieve collision avoidance with particular objects and/or to seek collision with other objects. This feature removes the limitation that the design be completely specialized to a single vehicle/roadmap pair. The collision assessor 288 uses the FPGA 290 or other programmable collision detection microarchitecture to provide a reconfigurable fabric of computing elements that allows fast calculation of shortest paths, for example, using a distributed Bellman-Ford strategy.

As noted above, some pre-processing activities may be performed before runtime and thus, in some embodiments, these operations may be performed by remote processing devices, which are linked through a communications network to the vehicle system 200 via network interface 260. For example, a programming phase allows configuration of the vehicle for the problem of interest. In such embodiments, extensive preprocessing is leveraged to avoid runtime computation. Precomputed data regarding the volume in 3D space swept by the vehicle 102 when making the transition in the roadmap from one state to another state represented by edges in the roadmap is sent to the collision assessor 288 of the motion planner 280. The topology of the roadmap may also be mapped onto a reconfigurable fabric of compute units, such as FPGA 290, to enable rapid determination of the shortest path. The mapping step includes programming each physical node of the reconfigurable fabric of compute units with the addresses and edge weights of its logical neighbors. This allows the architecture to be targeted to different roadmap topologies. During the runtime phase, the sensors 282 send perception data to the motion planner 280. The perception data is a stream of which voxels or boxes (described in greater detail below) are present in the current environment. The collision assessor 288 calculates which motions are likely to involve collision and which are not and, upon completion, the results are used by the motion planner 280 to determine the shortest path. This may advantageously occur without further communication with the sensors 282 or other external components. The motion planner 280 modifies costs associated with the roadmap accordingly during runtime based on the environment, depending on the goal of the vehicle 102 to avoid or seek collision with particular objects in the environment. The motion planner 280 then runs and returns a resulting path to the actuator system 266. FIG. 2 shows a vehicle computer system 200, such as that for autonomous vehicle 102, comprising a motion planner 280 and one or more associated nontransitory machine-readable storage media, such as system memory 214 and computer-readable media 226 associated with disk drive 224. The associated nontransitory computer- or processor-readable storage media, including system memory 214 and computer-readable media 226 associated with disk drive 224, is communicatively coupled to the motion planner 280 via one or more communications channels, such as system bus 216. The system bus 216 can employ any known bus structures or architectures, including a memory bus with memory controller, a peripheral bus, and/or a local bus. One or more sensors 282, an object detector 284, an object behavior predictor 286 and an actuator system 266 are also communicatively coupled to the motion planner 280 via system bus 216. One or more of such components may also or instead be in communication with each other via one or more other communications channels, for example, one or more parallel cables, serial cables, or wireless network channels capable of high speed communications, for instance Universal Serial Bus ("USB") 3.0, Peripheral Component Interconnect Express (PCIe) or via Thunderbolt®.

The vehicle computer system 200 may also be communicably coupled to remote systems, e.g., desktop computer, laptop computer, ultraportable computer, tablet computer, smartphone, wearable computer, (not shown) that are directly communicably coupled or indirectly communicably coupled to the various components of the vehicle computer system 200 via the network interface 260. Such remote systems may be used to program, configure, control or otherwise interface with or input data to the vehicle computer system 200 and various components within the vehicle computer system 200. Such a connection may be through one or more communications channels, for example one or more wide area networks (WANs), for instance the Internet, using Internet protocols. As noted above, pre-runtime calculations (e.g., initial roadmap generation) may be performed by a system that is separate from the vehicle 102 or other robot, while runtime calculations may be performed on the vehicle 102 since it is important for the system to be able to update or change vehicle velocity to react in real time or near real time (microseconds) and to a changing operational environment 100.

Unless described otherwise, the construction and operation of the various blocks shown in FIG. 2 are of conventional design or are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," and/or International Patent Application Publication No. WO 2016/122840, filed Jan. 5, 2016, entitled "SPECIALIZED ROBOT MOTION PLANNING HARDWARE AND METHODS OF MAKING AND USING SAME." As a result, such blocks need not be described in further detail, as they will be understood by those skilled in the relevant art in view of the references incorporated by reference herein.

The vehicle computer system 200 may include one or more processing units 212a, 212b (collectively 212), the system memory 214 and the system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. Such ASICs and FPGAs may be used instead of or in addition to the FPGA 290 of the collision assessor 288 to perform a collision assessment on the edges of a planning graph for the vehicle 102. The system memory 214 may include read-only memory ("ROM") 218 and random access memory ("RAM") 220. A basic input/output system ("BIOS") 222, which can form part of the ROM 218, contains basic routines that help transfer information between elements within the vehicle computer system 200, such as during start-up.

The vehicle computer system 200 may include a disk drive 224, which may be, for example, a hard disk drive for reading from and writing to a hard disk, a flash memory drive for reading from and writing to removable flash memory devices, an optical disk drive for reading from and writing to removable optical disks, or a magnetic disk drive for reading from and writing to magnetic disks. The vehicle computer system 200 may also include any combination of such disk drives in various different embodiments. The hard drive 224 may communicate with the processing units 212 via the system bus 216. The disk drive 224 may include interfaces or controllers (not shown) coupled between such drives and the system bus 216, as is known by those skilled in the relevant art. The disk drive 224 and its associated computer-readable media 226 provide nonvolatile storage of computer-readable instructions, data structures, program modules and other data for the vehicle computer system 200. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to perform collision assessment on edges of a planning graph corresponding to environment 100, determine and set a probability of collision for each edge of the planning graph, perform an optimization to identify a path in a planning graph to either avoid collision or cause collision with an object in the environment 100 (e.g., dynamic object B 112). The optimization to identify a path in a planning graph may include finding a shortest path within the planning graph. The application programs 238 may include instructions that then cause the processor(s) 212 to send signals to the actuator system 266 to cause the vehicle 102 to move according to the motion plan as described herein. Application programs 238 may additionally include one or more machine-readable instruction sets that cause the processor(s) 212 to perform other operations of perception (via sensors 282), planning graph construction, collision detection, and path search as described herein and in the references incorporated herein by reference.

Application programs 238 may additionally include one or more machine-readable instruction sets that cause the processor(s) 212 to receive perception information from the sensors 282 that represents the environment 100 in which the vehicle 102 operates; cause the motion planner 280 to use the reconfigurable collision detection architecture hardware of the collision assessor 288 to perform a collision assessment on each of two or more of the edges of a resulting planning graph for the vehicle 102; for each of two or more edges of the resulting planning graph, set a probability of collision based at least in part on the collision assessment; perform an optimization to identify a path in the resulting planning graph with a relatively high potential of a collision with one or more objects (e.g., dynamic object A 104) in the environment 100 in which the vehicle 102 operates; and cause the actuator system 266 to implement a motion plan with the relatively high potential of a collision with one or more objects (e.g., dynamic object A 104) in the environment 100 in which the vehicle 102 operates based at least in part on the optimization. The reconfigurable collision detection architecture hardware may be, for example, an FPGA 290. However, other programmable collision detection microarchitectures that include an array of programmable logic blocks and a hierarchy of reconfigurable interconnects may be used in various alternative embodiments, such as an ASIC architecture.

Application programs 238 may additionally include one or more machine-readable instruction sets that cause the processor(s) 212 to, based at least in part on an assessment of probability of a collision with one or more dynamic objects in the environment 100 in which the vehicle 102 operates, for a planning graph: assign a weight with a value equal to or greater than zero to each edge of the planning graph if the respective edge has a relatively low respective probability of a collision with one or more dynamic objects in the environment 100; assign a weight with a value less than zero to each edge of the planning graph if the respective edge has a relatively high respective probability of a collision with one or more dynamic objects in the environment 100; and perform an optimization to identify a path in on the resulting planning graph to identify a path with a relatively high potential of a collision with one or more objects (e.g., dynamic object B 112) in the environment 100 in which the vehicle 102 operates.

Application programs 238 may additionally include one or more machine-readable instruction sets that cause the processor(s) 212 to receive perception information via sensors 282 that represents the environment 100 in which the vehicle 102 operates; cause the motion planner 280 to use the reconfigurable collision detection architecture hardware of the collision assessor 288 to perform a collision assessment on each of two or more of the edges of a planning graph; for each of two or more edges of the planning graph, set a probability of collision based at least in part on the collision assessment; perform an optimization to identify a path in the resulting planning graph that provides a longest route of travel of the vehicle 102 in two-dimensional or three-dimensional space as specified by the path with a relatively low potential of a collision with one or more dynamic objects (e.g., dynamic object B) in the environment 100 in which the vehicle 102 operates; and implement a motion plan with the relatively low potential of a collision with one or more dynamic objects (e.g., dynamic object B) in the environment 100 in which the vehicle 102 operates based at least in part on the optimization.

Application programs 238 may additionally include one or more machine-readable instruction sets that cause the processor(s) 212 to perform various other methods described herein, including, but not limited to, those illustrated in FIGS. 6 through 13.

While shown in FIG. 2 as being stored in the system memory 214, the operating system 236, application programs 238, other programs/modules 240, and program data 242 can be stored on associated computer-readable media 226 of the disk drive 224.

The processor(s) 212 may be any logic processing units, such as one or more central processing units (CPUs), digital signal processors (DSPs), application-specific integrated circuits (ASICs), field programmable gate arrays (FPGAs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. Unless described otherwise, the construction and operation of the various blocks shown in FIG. 2 are of conventional design. As a result, such blocks need not be described in further detail herein, as they will be understood by those skilled in the relevant art. The reconfigurable collision detection architecture hardware of the collision assessor 288 of the motion planner 280 may be one of such architectures described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," such as, for example, an architecture that comprises an array of nodes formed of the Bellman-Ford Compute Units (BFCUs) and connected via a low-cost interconnection network used to achieve reconfigurable topologies.

Figure 3:
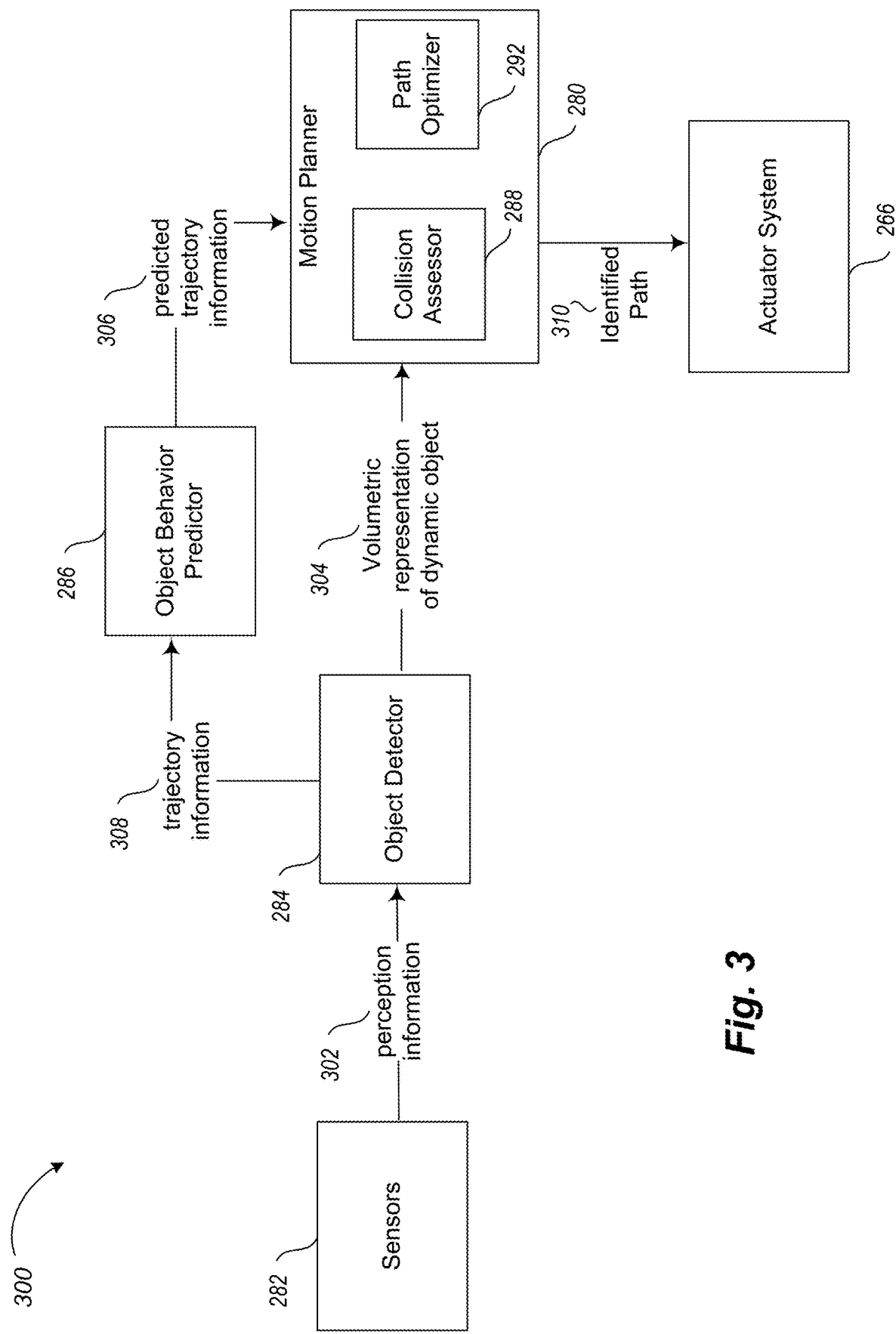
FIG. 3 is a block diagram showing example data flow between various components in the vehicle computer system of FIG. 2, according to one illustrated embodiment.

FIG. 3 is a block diagram showing example data flow 300 between various components in the vehicle computer system of FIG. 2, according to one illustrated embodiment. One or more sensors 282, such as cameras, laser sensor equipment, audio sensors, etc., either incorporated within the vehicle 102 or in operable communication with the vehicle 102, collect perception information 302 and communicate this to the object detector 284 to produce a model of the environment 100. The object detector 284 extracts trajectory information regarding detected movement of dynamic objects, such as dynamic object A 104 and dynamic object B 112 in the environment 100, and communicates such trajectory information 308 to object behavior predictor 286. Based at least in part on the current detected trajectory of the dynamic object in the environment 100 as indicated by the trajectory information 308, object behavior predictor 286 generates one or more predicted trajectories of the dynamic object and communicates this information as part of the predicted trajectory information 306 to the motion planner 280. For example, if the trajectory information 308 indicates dynamic object A 104 is currently on a trajectory heading in a particular direction, the object behavior predictor 286 may predict with 40% probability that dynamic object A 104 will continue in its current trajectory, with 60% probability it does something else.

Various factors may influence the determination of the object behavior predictor 286 of the predicted trajectory of a dynamic object in the environment 100. For example, in some implementations, it may be indicated or determined that a dynamic object has a goal that will affect its future movement within environment 100. As one example, it may be indicated or determined that dynamic object A 104, which is detected to be currently on a trajectory directly away from the vehicle 102, has a goal to get away (and stay away) from vehicle 102. Therefore, the object behavior predictor 286 may take this into consideration when predicting the movement of dynamic object A 104. On the other hand, it may be indicated or determined that dynamic object B 112, which is detected to be currently on a trajectory directly toward the vehicle 102, has a goal to collide with vehicle 102. Therefore, the object behavior predictor 286 may take this into consideration when predicting the movement of dynamic object B 112.

Additionally, the movement of the dynamic object may be affected by a change in a trajectory of the vehicle 102. Therefore, the object behavior predictor 286 may take a planned, and not yet implemented or performed, change in a current trajectory of the vehicle 102 into consideration when determining a predicted trajectory of a dynamic object and include such data in the predicted trajectory information 306 provided to the motion planner 280. For example, if it is indicated or determined that dynamic object B 112, which is detected to be currently on a trajectory directly toward the vehicle 102, has a goal to collide with vehicle 102, it may be predicted that if vehicle 102 changes its trajectory, dynamic object B 112 may make a corresponding change in its trajectory to chase vehicle 102. Thus, if vehicle 102 has a goal to reach a destination within environment 100 without colliding with dynamic object B 112 (that is trying to collide with the vehicle 102), then the motion planner 280 may be able to plan a path to the destination to avoid collision with dynamic object B 112, taking into consideration dynamic object B 112 may make a corresponding change in its trajectory to chase vehicle 102 when vehicle 102 changes its trajectory to reach the destination.

Overall, the system performs perception by the use of a combination of the sensors 282 and processing performed by the object detector 284 and object behavior predictor 286 to produce a model of the environment 100. In one implementation, the sensors 282 produce an occupancy grid. An occupancy grid is a data structure representing which regions of space and time contain obstacles in a discretized view of the environment, such as environment 100. Each discretized region of space is termed a "voxel," equivalent to a 3D (volumetric) pixel. In some cases, it is advantageous to represent the objects instead as boxes (rectangular prisms). The regions of space defined by the objects in the environment, including dynamic object A 104, dynamic object B 112 and static object C 108, are represented by such volumetric representations. The volumetric representation of one or more dynamic objects (e.g., dynamic object A 104 and dynamic object B), as well as volumetric representation of relevant static objects are communicated to the motion planner 280 from the object detector 284. Construction of an occupancy grid is described in the vast body of published literature available and known to those of ordinary skill in the art of computer vision and sensing.

The motion planner 280 receives perception data, including volumetric representation of dynamic and static objects from the object detector 284 and predicted trajectory information from the object behavior predictor. The motion planner 280 then adjusts a probability of collision along each edge in a planning graph that results in a collision with obstacles in the perception data to account for the predicted trajectories, determines a path considering cost and probability of collision, and outputs the path to the computing system.

The motion planner can include a hardware processor and memory storage as part of a collision assessor 288 within the motion planner 280. For example, FPGA 290 or other array of programmable logic blocks can store a planning graph, also referred to herein as a "roadmap" (see, e.g., FIGS. 4A through 5B). In some implementations, the motion planner 280 includes hardware collision detection circuits, such as FPGA 290, to perform collision detection. In some implementations, the motion planner 280 includes reconfigurable collision detection acceleration. Data regarding the volume in 2D or 3D space swept by the vehicle 102 when making the transition in the roadmap from one state to another state represented by edges in the roadmap can be stored at a memory storage of the collision assessor 288 of the motion planner 280 such that during motion planning, as perception data is received, including predicted trajectory information, the perception data is compared by a hardware processor of the collision assessor 288 to the data stored in the memory storage of the collision assessor 288 (or local system memory 214 of the vehicle computer system 200) to determine collisions. During runtime operation, the edges of the planning graph can be assigned information based on one or more variables. For example, in the case where the goal of the vehicle 102 is to collide with dynamic object A 104, based on predictions of where the dynamic object A 104 is headed according to the predicted trajectory information 306, the motion planner 280 will generate a motion plan for vehicle 102 to collide with dynamic object A 104. To do this, the collision assessor 288 evaluates all edges in the planning graph for the likelihood of collision with dynamic object A 104. Note that the environment 100 is the two- or three-dimensional space in which the vehicle operates, and is different than the vehicle's "configuration space" referenced below with respect to the motion planning graphs represented in FIGS. 4A through 5B. The vehicle's configuration space is the space of all configurations of the vehicle that characterize a state of the vehicle, typically a multi-dimensional space, e.g., with more than three dimensions. The edges in the planning graphs 400 and 500 represented in FIGS. 4A through 5B represent transitions between configurations of the vehicle 102. The edges of planning graph 400 do not necessarily represent actual movements in Cartesian coordinates, but they might in some embodiments. The edges of planning graph 400 may also include velocity changes, etc.

Each edge of the planning graphs 400 and 500 represents a transition of the vehicle from one state to another state and has an inherent cost associated with it. For example, such cost may be related fuel usage and other factors. Each edge has an initial weight corresponding to this cost. For edges on the planning graph, which represent transitions in states of the vehicle, the system sets a probability of collision with a dynamic object in the environment based at least in part on the collision assessment and then modifies the initial weights of the edges based on the probability of collision with the dynamic object. The system does this by assigning weights to each edge based on the probability of collision and then using these assigned weights to modify the initial weight for that edge that corresponds to the inherent cost. This may be performed, for example, by adding the assigned weight based on the probability of collision to the initial weight that corresponds to the inherent cost, or according to some other function or formula involving the assigned weight based on the probability of collision and the initial weight that corresponds to the inherent cost. For simplicity of illustration in FIGS. 4A through 5B, all initial weights corresponding to the inherent cost of each edge have been set to zero. Thus, in one implementation in which the goal of the vehicle 102 is to collide with a dynamic object in the environment (such as dynamic object A 104), a probability of zero corresponds to an edge weight of 0, and greater probability of collision corresponds to a larger negative value (a negative number with a larger absolute value). In another implementation in which the goal of the vehicle 102 is to avoid collision with a dynamic object in the environment (such as dynamic object B 112) a greater probability of collision corresponds to a larger positive value to be assigned as an edge weight to the corresponding edge in the planning graph. Once all edge weights of the planning graph have been assigned, the path optimizer 292 performs a shortest path algorithm from the current position of the vehicle 102 indicated in the planning graph to all possible final points at which the vehicle 102 has run out of fuel. The smallest (most negative) path in the planning graph is then selected by the motion planner 280. In various implementations, values assigned to the edges can be associated with or affected by any number of variables associated with cost and/or risk. For example, some edges may incur greater cost of fuel to traverse, or may be associated with other risks.

Once the path optimizer 292 identifies the path within the planning graph, the motion planner immediately communicates this identified path 310 to the actuator system 266 of the vehicle 102 in real time to generate the corresponding signals to the various motors or movement systems of the vehicle 102 to cause the physical movements of the vehicle 102 to occur to implement the motion plan.

Figure 4A:
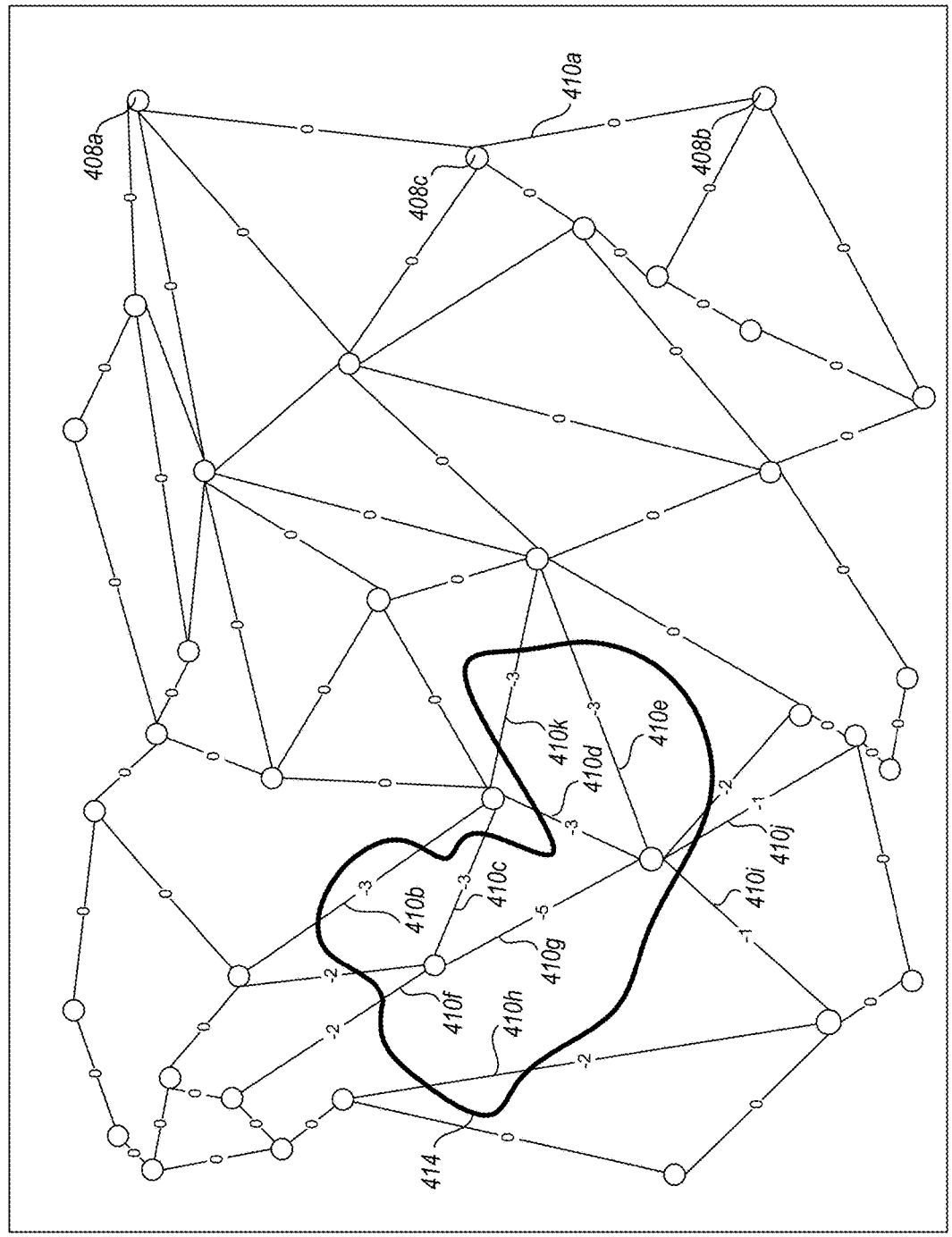
FIG. 4A is an example motion planning graph for the vehicle of FIG. 1 in the case where the goal of the vehicle is to collide with the dynamic object of FIG. 1 that is possibly trying to evade the vehicle, according to one illustrated embodiment.

FIG. 4A is an example motion planning graph 400 for the vehicle 102 of FIG. 1 in the case where the goal of the vehicle 102 is to collide with the dynamic object A 104 of FIG. 1 that may be trying to avoid the vehicle 102, according to one illustrated embodiment. The planning graph 400 comprises a plurality of nodes connected by edges. For example, node 408b and node 408c are connected by edge 410a. Each node represents, implicitly or explicitly, time and variables that characterize a state of the vehicle 102 in the vehicle's configuration space. The vehicle's configuration space (often called C-space), in the present example, is the space of the configurations of the vehicle represented in the planning graph 400 that characterize a state of the vehicle. The edges in the planning graph 400 represent transitions between these configurations of the vehicle 102. The edges of planning graph 400 do not represent actual movements in Cartesian coordinates. For example, each node may represent the configuration of the vehicle, which may include, but is not limited to, the current position, pose, velocity and heading of the vehicle 102. In some embodiments, the acceleration of the vehicle 102 is also represented by the nodes in the planning graph 400.

Each edge of planning graph 400 represents a transition of an object between a respective pair of nodes. For example, edge 410a represents a transition of an object, such as vehicle 102, between two nodes. In particular, edge 410a represents a transition between a state of the vehicle 102 at a particular configuration associated with node 408b and a state of the vehicle 102 associated with node 408c. For example, vehicle 102 may currently be in a particular configuration associated with node 408a. Although the nodes are shown at various distances from each other, this is for illustrative purposes only and this is no relation to any physical distance and there is no limitation on the number of nodes in the planning graph 400. However, the more nodes that are used in the planning graph 400, the more accurately and precisely the motion planner 280 may be able to determine the correct path according to the goal of the vehicle 102.

There may be instances where it is desirable for vehicle 102 to follow or intercept dynamic object A 104, such as to inspect dynamic object A 104, collect information from dynamic object A 104, exchange information with dynamic object A 104, or even collide with dynamic object A 104 in a game. FIG. 4A shows how a planning graph is used by the motion planner 280 to identify a path for vehicle 102 in the case where the goal of the vehicle 102 is to collide with dynamic object A 104. At this point, the motion planner 280 has received perception information that represents the environment 100 in which the vehicle 102 operates. As described above, collision detection may use voxels or boxes to represent objects in the environment, including vehicle 102 and dynamic object A 104, to the motion planner 280. It should be understood, however, that other object representations may be used.

In one implementation, the environment is discretized into 3D regions of voxels or boxes. Then, all possible collisions between the swept volume of every motion by the vehicle 102 in the environment 100 and the voxels or boxes in the discretized space are precomputed. Examples of such collision assessment are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS" and in International Patent Application Publication No. WO 2016/122840, filed Jan. 5, 2016, entitled "SPECIALIZED ROBOT MOTION PLANNING HARDWARE AND METHODS OF MAKING AND USING SAME."

Due to the fact that dynamic object A 104 is moving in the environment 100, the motion planner 280 also determines a collision assessment of vehicle 102 with dynamic object A 104 for two or more edges in the planning graph 400 based on predictions of where dynamic object A 104 is headed. For each of these edges of the planning graph 400, the motion planner 280 sets a probability of collision of the vehicle 102 with the dynamic object A 104 at particular future times based at least in part on the collision assessment. For example, according to the perception information, dynamic object A 104 is detected to be at a particular position in the environment 100. Based on the current trajectory 110 of dynamic object A 104, the motion planner 280 determines that the dynamic object A 104 will be at a particular position in the environment 100. For nodes in the planning graph 400 where there is a probability that direct movement between them will cause a collision with dynamic object A 104, the motion planner assigns a weight to the edges of the planning graph 400 transitioning between those nodes (edges 410b, 410c, 410d, 410e, 410f, 410g, 410h, 410i, 410j, 410k) indicating the probability of a collision with dynamic object A 104. In the example shown in FIG. 4A, this is denoted as graph portion 414, but does not correspond to a physical area.

For example, the motion planner 280 may, for each of a number of edges of the planning graph 400 that has a respective probability of a collision with dynamic object A 104 below a defined threshold probability of a collision, assign a weight with a value equal to or greater than zero. In the present example, the motion planner 280 has assigned a weight of zero to those edges in the planning graph 400 which, according to the current trajectory of the dynamic object A 104, do not have any (or have very little) probability of a collision with dynamic object A 104. For example, as shown on the planning graph 400, the motion planner 280 has assigned a weight of zero to edge 410a since, according to the current trajectory 110 of dynamic object A, there is no (or very little) probability of a collision with dynamic object A 104 at edge 410a. The motion planner 280 then, for each of a number of edges of the planning graph 400 with a respective probability of a collision with dynamic object A 104 in the environment 100 above a defined threshold probability of a collision, assigns a weight with a value less than zero. In the present example, the motion planner 280 has assigned a weight of less than zero to those edges in the planning graph 400 which, according to the current trajectory of the dynamic object A 104, have a higher probability of collision with dynamic object A 104. The particular threshold used for the probability of collision may vary. For example, the threshold may be 40%, 50%, 60% or lower or higher probability of collision. Also, the motion planner 280 assigning a weight with a value less than zero may include assigning a negative weight with a magnitude that corresponds with the respective probability of a collision. For example, as shown in the planning graph 400, the motion planner has assigned a weight of −3 to edges 410b, 410c, 410*d* and 410*e*, but has assigned a negative weight with a lower magnitude of −2 to edge 410*f*, and has assigned a weight with a higher magnitude of −5 to edge 410*g*. The assigned weights need not be integers.

Figure 4B:
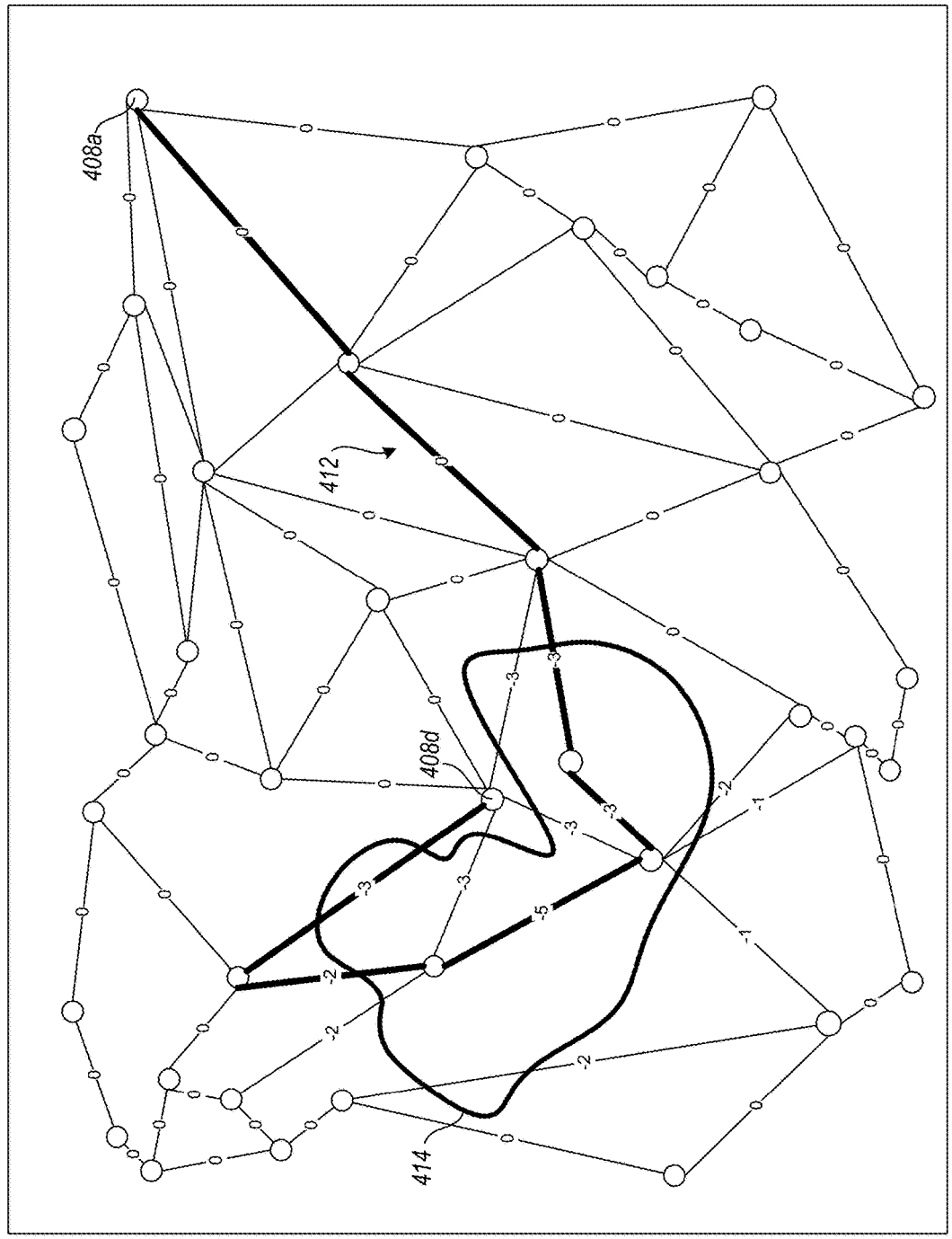
FIG. 4B is an example motion planning graph for the vehicle of FIG. 1 in the case where the goal of the vehicle is to collide with the dynamic object of FIG. 1 that is possibly trying to evade the vehicle and an example path identified in the planning graph for the vehicle to collide with the dynamic object, according to one illustrated embodiment.

FIG. 4B is an example motion planning graph 400 for the vehicle 102 of FIG. 1 in the case where the goal of the vehicle 102 is to collide with the dynamic object A 104 of FIG. 1 that is possibly trying to avoid the vehicle 102, and an example path 412 (including the bolded edges of graph 400 connecting node 408*a* to 408*d*) identified in the planning graph 400 for the vehicle 102 to collide with the dynamic object A 104, according to one illustrated embodiment. After the motion planner 280 sets a probability of collision of the vehicle 102 with the dynamic object A 104 based at least in part on the collision assessment, the motion planner 280 performs an optimization to identify a path 412 in the resulting planning graph 400 with a relatively high potential of a collision with the dynamic object A 104.

For example, once all edge weights of the planning graph 400 have been assigned as shown in FIGS. 4A and 4B, the motion planner 280 may perform a shortest path algorithm from the current state of the vehicle 102 in the planning graph 400 to all possible final points at which the vehicle 102 has run out of fuel. The smallest (most negative) path in the planning graph 400 is then selected by the motion planner 280. In the present example, the current state of the vehicle 102 in the planning graph is at node 408*a* and this smallest (most negative path) is depicted as path 412 in the planning graph 400. Although shown as a path in planning graph 400 with many sharp turns, such turns do not represent corresponding physical turns in a route, but logical transitions between states of the vehicle 102. For example, each node in the identified path 412 may represent a state change with respect to physical configuration of the vehicle 102 in the environment 100, but not necessarily a change in heading of the vehicle 102 corresponding to the angles of the path 412 shown in FIG. 4B.

Various processes for determining the "shortest path" may be used, including those implementing the Bellman-Ford algorithm, but others may be used, including, but not limited to, any such process in which the shortest path is determined as the path between two nodes in the planning graph 400 such that the sum of the weights of its constituent edges is minimized. As shown in FIG. 4B, the identified path 412 generally follows the trajectory 110 of dynamic object A 104, which corresponds with the goal of the vehicle in the present example to collide with dynamic object A 104. This process improves the technology of autonomous vehicle motion planning for collision with dynamic objects by using planning graphs and collision detection to increase the efficiency and response time to find the best route to collide with the desired object. Additionally, some implementations use the same process of identifying a path for the vehicle 102 with a relatively high potential of a collision with one or more static objects in the environment in which the vehicle operates. In cases where the collision is sought with such static objects, the motion planner 280 assigns a weight a value of minus infinity for each of a number of edges of the planning graph 400 that has a respective probability of a collision with the static object in the environment 100. In this manner, when the motion planner selects the shortest path during optimization, such paths having edge weights set to minus infinity will be selected since there is no uncertainty that there will be collision with the static object if that edge is traversed. However, in such implementations, there is no velocity, trajectory or acceleration of a static object that need be accounted for.

In some implementations, there may be static objects in the environment which vehicle 102 should avoid colliding with while attempting to collide with dynamic object A 104. In such a case, setting the probability of collision for the edges of the planning graph 400 based on the collision assessment includes assigning weights to avoid collision with such static objects accordingly. For example, the motion planner 280 assigns a weight with a value of infinity for each of a number of edges of the planning graph 400 that has a respective probability of a collision with the static object in the environment 100. In this manner, when the motion planner selects the shortest path during optimization, such paths having edge weights set to infinity will be avoided since there is no uncertainty that there will be collision with the static object if that edge is traversed.

The motion planner 280 may perform the optimization to identify a path in the resulting planning graph 400 with a highest potential of a collision with dynamic object A 104 along an entire route of the vehicle 102. In some implementations, the length of the route may be defined at least in part by when the vehicle 102 runs out of fuel. A variable indicating the "remaining fuel" of the vehicle 102 may be stored by the vehicle computer system 200. In some implementations, the motion planner 280 may perform the optimization to identify a path in the resulting planning graph 400 with a relatively high potential of a collision in a shortest relative amount of time with one or more objects in the environment in which the vehicle operates. Alternatively, in some implementations, the motion planner 280 may perform the optimization to identify a path in the resulting planning graph 400 with a longest duration of travel as specified by the path with a relatively high potential of a collision with dynamic object A 104.

The path in the planning graph 400 may also be identified based on a change or predicted change in the trajectory 110 of dynamic object A. At each change or predicted change in the trajectory 110 of dynamic object A 104, the collision assessment and optimization process may be run again in real time or near real time. Also, the resulting planning graph 400 may have or store associated data which represents the physical or performance constraints of the vehicle and/or dynamic object, the acceleration, the pitch, the roll and the yaw of the vehicle 102, and in some implementations, also of the dynamic object A 104. The optimization to identify the path may then be performed based on such variables. For example, if the pitch, the roll and/or the yaw of the vehicle dynamic object A 104 changes, this may indicate a change (or result in a predicted change) in trajectory of dynamic object A 104.

Figure 5A:
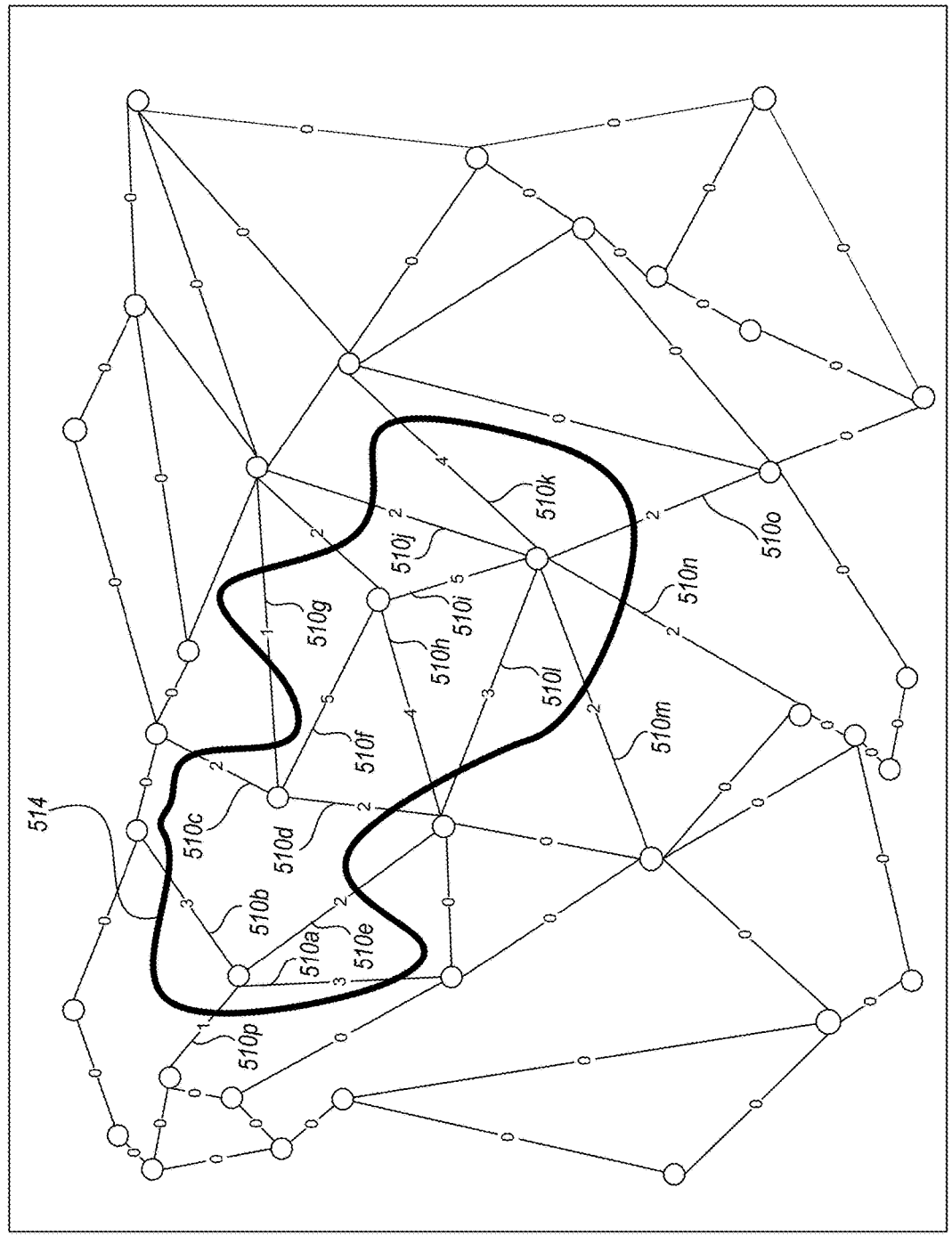
FIG. 5A is an example motion planning graph for the vehicle of FIG. 1 in the case where the goal of the vehicle is to avoid collision with the dynamic object of FIG. 1 that is approaching the vehicle, according to one illustrated embodiment.

FIG. 5A is an example motion planning graph 500 for the vehicle 102 of FIG. 1 in the case where the goal of the vehicle 102 is to avoid collision with the dynamic object B 112 of FIG. 1 that is approaching the vehicle 102, according to one illustrated embodiment. Similar to planning graph 400, planning graph 500 respectively comprises a plurality of nodes connected by edges. Each node represents, implicitly or explicitly, time and variables that characterize a state of the vehicle 102. For example, each node may represent the configuration of the vehicle, which may include, but is not limited to, the current position, pose, velocity and heading of the vehicle 102. In some embodiments, the acceleration of the vehicle 102 is also represented by the nodes in the planning graph 500.

There may be instances where it is desirable for vehicle 102 to avoid dynamic object B 112, such as to avoid collision with dynamic object B 112. FIG. 5A shows how a planning graph is used by the motion planner 280 to identify a path for vehicle 102 in the case where the goal of the vehicle 102 is to avoid collision with or evade dynamic object B 112, and dynamic object B 112 is attempting to collide with vehicle 102, such as in a game. At this point, the motion planner 280 has received perception information that represents the environment 100 in which the vehicle 102 operates. As described above, collision detection may use voxels or boxes to represent objects in the environment, including dynamic object B 112. Voxels or boxes may also be used to represent vehicle 102 to the motion planner 280. It should be understood, however, that other object representations may be used. In one implementation, the environment is discretized into 3D regions of voxels or boxes. Then, all possible collisions between the swept volume of every motion by the vehicle 102 in the environment 100 and the voxels or boxes in the discretized space are precomputed.

Due to the fact that dynamic object B 112 is moving in the environment 100, the motion planner 280 also determines a collision assessment of vehicle 102 with dynamic object B 112 for two or more edges in the planning graph 500 based on predictions of where dynamic object B 112 is headed. For each of these edges of the planning graph 500, the motion planner 280 sets a probability of collision of the vehicle 102 with the dynamic object B 112 at particular future times based at least in part on the collision assessment. For example, according to the perception information, dynamic object B 112 is detected to be at a particular position in the environment 100. Based on the current trajectory 106 of dynamic object B 112, the motion planner 280 determines that the dynamic object B 112 will be at a particular position in the environment 100. For nodes in the planning graph 500 where there is a probability that direct movement between them will cause a collision with dynamic object B 112, the motion planner assigns a weight to the edges of the planning graph 500 transitioning between those nodes (edges 510a, 510b, 510c, 510d, 510e, 510f, 510g, 510h, 510i, 510j, 510k, 510l, 510m, 510n, 510o and 510p) indicating the probability of a collision with dynamic object B 112. In the example shown in FIG. 5A, this is denoted as graph portion 514, but does not correspond to a physical area.

For example, the motion planner 280 may, for each of a number of edges of the planning graph 500 that has a respective probability of a collision with dynamic object B 112 above a defined threshold probability of a collision, assign a weight with a value greater than zero. In the present example, the motion planner 280 has assigned a weight of zero to those edges in the planning graph 500 which, according to the current trajectory of the dynamic object B 112, do not have any (or have very little) probability of a collision with dynamic object B 112. The motion planner 280 then, for each of a number of edges of the planning graph 500 with a respective probability of a collision with dynamic object B 112 in the environment 100 above the defined threshold probability of a collision, assigns a weight with a value greater than zero. In the present example, the motion planner 280 has assigned a weight of greater than zero to those edges in the planning graph 500 which, according to the current trajectory of the dynamic object B 112, have a higher probability of collision with dynamic object B 112. The particular threshold used for the probability of collision may vary. For example, the threshold may be 40%, 50%, 60% or lower or higher probability of collision. Also, the motion planner 280 assigning a weight with a value greater than zero may include assigning a weight with a magnitude greater than zero that corresponds with the respective probability of a collision. For example, as shown in the planning graph 500, the motion planner has assigned a weight of 5 to edges 510f and 510i that have a higher probability of collision, but has assigned a weight with a lower magnitude of 1 to edges 510p and 510g, which the motion planner 280 determined have a much lower probability of collision.

Figure 5B:
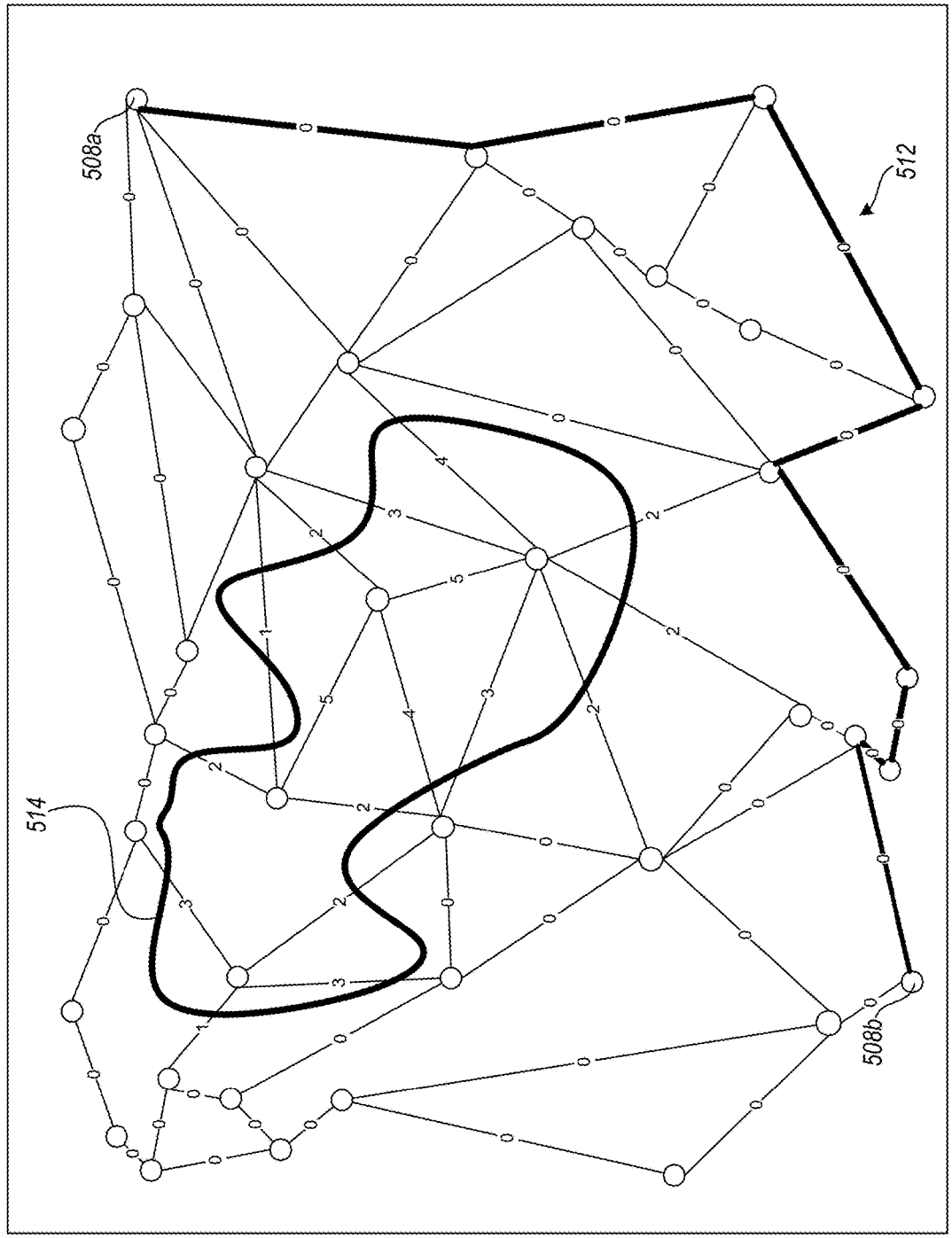
FIG. 5B is an example motion planning graph for the vehicle of FIG. 1 in the case where the goal of the vehicle is to avoid collision with the dynamic object of FIG. 1 that is approaching the vehicle and an example path identified in the planning graph for the vehicle to avoid collision with the dynamic object, according to one illustrated embodiment.

FIG. 5B is an example motion planning graph 500 for the vehicle of FIG. 1 in the case where the goal of the vehicle 102 is to avoid collision with the dynamic object B 112 of FIG. 1 that is approaching the vehicle, and an example path 512 (including the bolded edges of graph 500 connecting node 508a to 508b) identified in the planning graph 500 for the vehicle to avoid collision with the dynamic object B 112, according to one illustrated embodiment. After the motion planner 280 sets a probability of collision of the vehicle 102 with the dynamic object B 112 based at least in part on the collision assessment, the motion planner 280 performs an optimization to identify a path 512 in the resulting planning graph 500 that provides a longest route of travel of the vehicle 102 as specified by the path with a relatively low potential of a collision with dynamic object B 112.

In one implementation, once all edge weights of the planning graph 500 have been assigned as shown in FIGS. 5A and 5B, the motion planner 280 may perform a calculation to determine the longest route of travel with the fuel remaining. For example, once all edge weights of the planning graph 500 have been assigned as shown in FIGS. 5A and 5B, the motion planner 280 may perform a shortest path algorithm from the current state of the vehicle 102 in the planning graph 500 to all possible final points at which the vehicle 102 has run out of fuel. The longest route (e.g., in time or distance) with the least cost (closest to zero) path in the planning graph 500 is then selected by the motion planner 280. However, the longest route and least cost (closest to zero) path in the planning graph 500 are often in competition. In the case in which the longest route is desired, finding the shortest path in the planning graph 500 is not as high a priority as selecting a path with the least probability of collision. In the present example, the current state of the vehicle 102 in the planning graph is at node 508a, and this path is depicted as path 512 in the planning graph 500.

In some implementations, there may be a secondary goal for the vehicle 102 to arrive at a particular destination (while avoiding collision with dynamic object B 112). In this case, the optimization may include performing a shortest path algorithm from the current state of the vehicle 102 in the planning graph 500 to the desired destination. In one embodiment, the goal of vehicle 102 is to maximize the time without a collision with dynamic object B 112 such that, for example, dynamic object B 112 runs out of fuel before colliding with the vehicle 102. The goal of vehicle 102 in one example embodiment is to minimize the probability of collision with dynamic object B 112 between the current time and time of arrival of the vehicle 102 at a desired destination or achieving a particular goal, or between the current time and when dynamic object B 112 runs out of fuel. This process improves the technology of autonomous vehicle motion planning for avoiding collision with dynamic objects by using planning graphs and collision detection to increase the efficiency and response time to find the best route to avoid collision with the dynamic object that may be seeking to collide with the autonomous vehicle. Additionally, some implementations use the same process of identifying a path for the vehicle 102 with a relatively low potential of a collision with one or more static objects in the environment in which the vehicle operates. In cases where the collision is to be avoided with such static objects, the motion planner 280 assigns a weight a value of infinity for each of a number of edges of the planning graph 500 that has a respective probability of a collision with the static object in the environment 100. In this manner, when the motion planner selects the shortest path during optimization, such paths having edge weights set to infinity will be avoided since there is no uncertainty that there will be collision with the static object if that edge is traversed. In such implementations, there is no velocity or trajectory of a static object to be accounted for.

In some implementations, there may be multiple dynamic objects, some of which vehicle 102 has a goal to avoid and others which vehicle 102 has a goal to intercept or collide with. In such implementations, the processes described herein for the vehicle 102 to collide with dynamic objects and the processes described herein for the vehicle 102 to avoid collision with dynamic objects may be implemented concurrently, simultaneously or otherwise in conjunction with each other. For example, some objects may be identified as those to collide with and others may be identified as objects to avoid collision with. The motion planner 280 then runs optimizations as described herein, accordingly taking into consideration the trajectories and perception information corresponding to the dynamic and static objects and whether such objects are to be collided with or avoided. In such a case, setting the probability of collision for the edges of the planning graph based on the collision assessment includes assigning weights to collide or avoid collision accordingly.

The motion planner 280 may perform the optimization to identify a path in the resulting planning graph 500 with a lowest potential of a collision with dynamic object B 112 along an entire route of the vehicle 102. In some implementations, the length of the route may be defined at least in part by when the vehicle runs out of fuel. A variable indicating the "remaining fuel" of the vehicle 102 may be stored by the vehicle computer system 200. In some implementations, the motion planner 280 may perform the optimization to identify a path in the resulting planning graph 500 with a longest duration of travel as specified by the path with a relatively low potential of a collision with dynamic object B 112. The path may also be identified based on a change or predicted change in the trajectory 106 of dynamic object B 112. At each change or predicted change in the trajectory 106 of dynamic object B 112, the collision assessment and optimization process may be run again in real time or near real time. Also, the resulting planning graph 500 may have data which represents the physical or performance constraints of the vehicle and/or dynamic object, the acceleration, the pitch, the roll and the yaw of the vehicle 102, and in some implementations, also of the dynamic object B 112. The optimization to identify the path may then be performed based on such variables. For example, if the pitch, the roll and/or the yaw of the vehicle dynamic object B 112 changes, this may indicate a change (or result in a predicted change) in trajectory of dynamic object B 112.

The motion planner 280 can be programmed for a wide range of autonomous vehicles and robots and expected task scenarios. The motion planner 280 can be reused, or reprogrammed, for different vehicles or robots or the motion planner 280 can be designed for a specific vehicle or robot. One type of robot is an autonomous vehicle, such as vehicle 102 as described herein.

Figure 6:
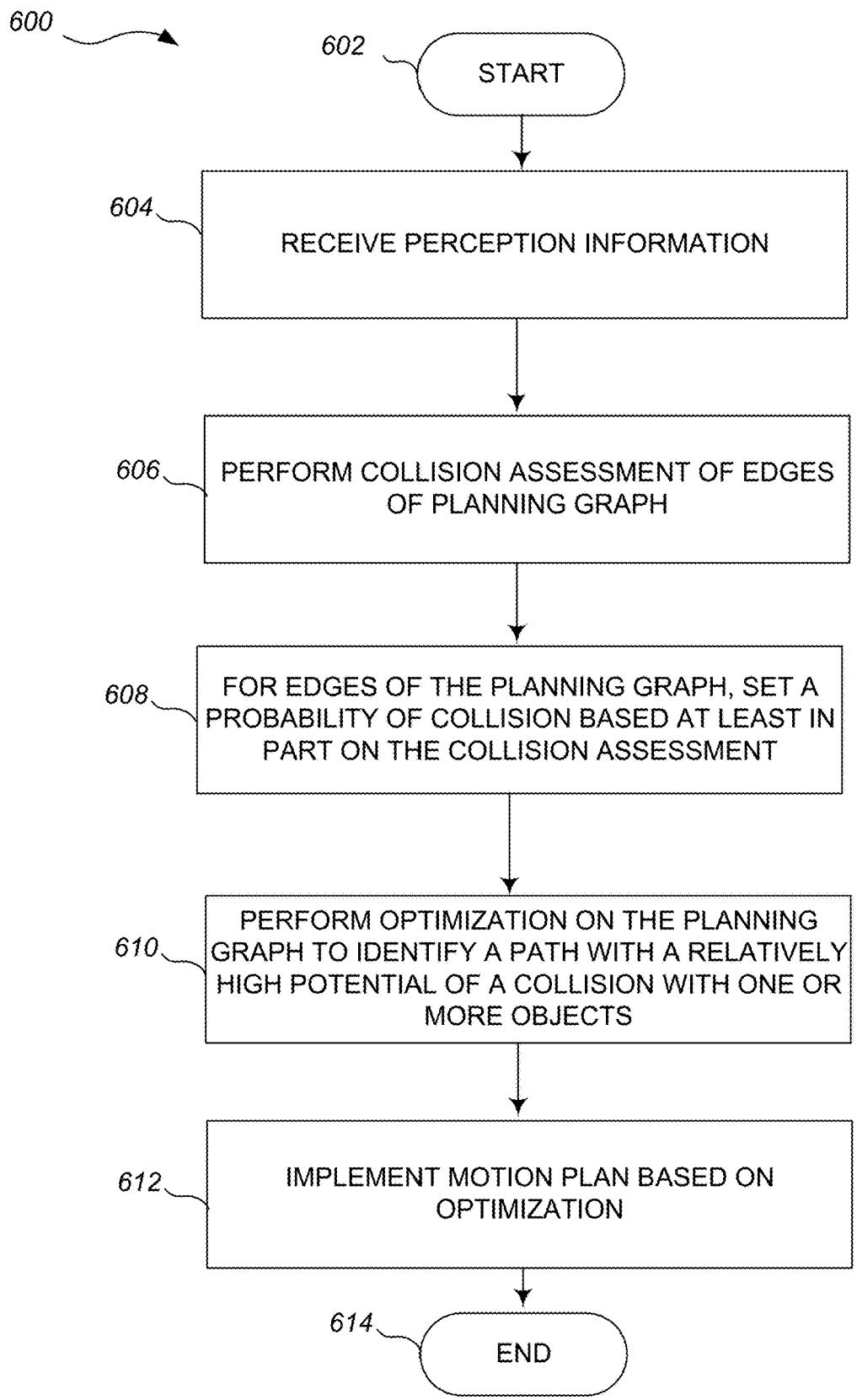
FIG. 6 is a flow diagram showing a method to identify paths for vehicles via planning graphs to intercept dynamic objects, according to one illustrated embodiment.

FIG. 6 is a flow diagram showing a method 600 to identify paths for vehicles via planning graphs to intercept dynamic objects, according to one illustrated embodiment. In one example implementation, the method 600 is a method of operation in a processor-based system to determine paths for vehicles via planning graphs. Each planning graph respectively comprises a plurality of nodes connected by edges. Each node represents, implicitly or explicitly, time and variables that characterize a state of the vehicle, which operates in an environment that includes one or more objects. Each edge represents a transition between a respective pair of nodes. The method 600 to identify paths for vehicles via planning graphs to intercept dynamic objects commences at 602.

At 604, the system 200 receives perception information 302 that represents the environment 100 in which the vehicle 102 operates.

At 606, the system 200 performs a collision assessment on each of two or more of the edges of a resulting planning graph 400 for the vehicle 102. In one embodiment, the collision detection may be performed for all voxels or boxes of an object in the environment with respect to one voxel or box of an edge at a time. In an alternative embodiment, the collision assessment may be performed in parallel on each of the edges of the planning graph 400 for the vehicle.

At 608, for each of two or more edges of the resulting planning graph 400, the system 200 sets a probability of collision based at least in part on the collision assessment.

At 610, the system 200 performs an optimization to identify a path, such as path 412 (including the bolded edges of graph 400 connecting node 408a to 408d), in the resulting planning graph 400 with a relatively high potential of a collision with one or more objects, such as dynamic object A 104, in the environment 100 in which the vehicle 102 operates.

At 612, the system 200 implements a motion plan with the relatively high potential of a collision with one or more objects in the environment 100 in which the vehicle 102 operates based at least in part on the optimization. The method 600 to identify paths for vehicles via planning graphs to intercept dynamic objects concludes at 614.

Figure 7:
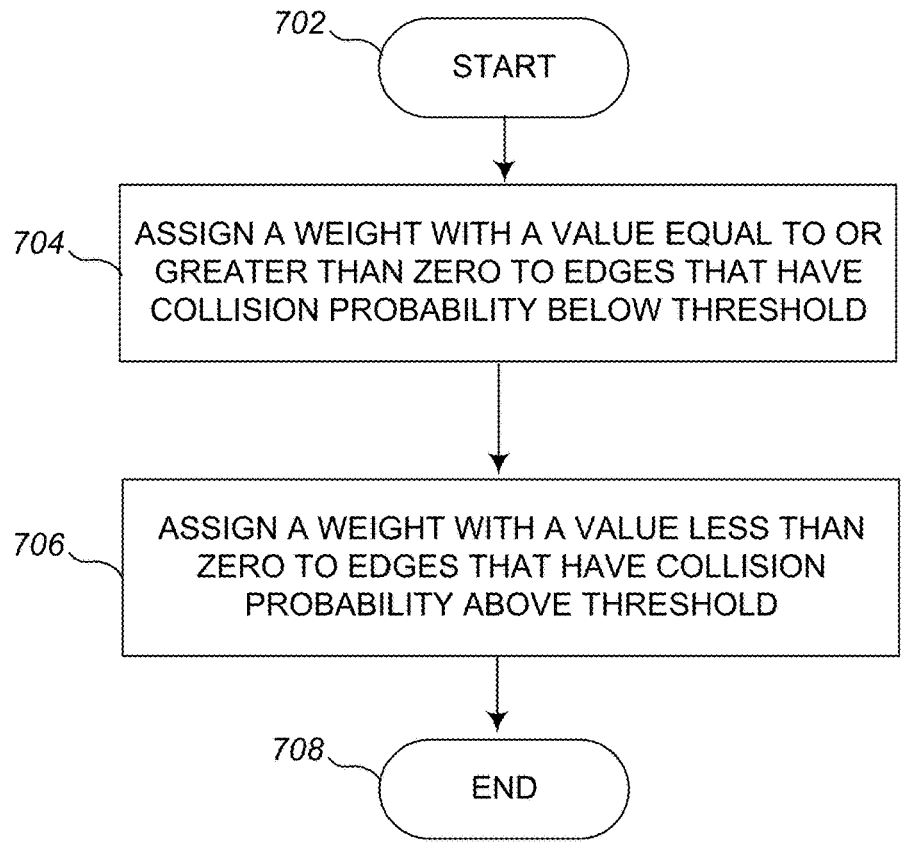
FIG. 7 is a flow diagram showing a method useful to set a probability of collision in the method of FIG. 6, according to one illustrated embodiment.

FIG. 7 is a flow diagram showing a method 700 useful to set a probability of collision in the method of FIG. 6, according to one illustrated embodiment. In particular, setting a probability of collision for each of two or more edges of the planning graph based at least in part on the collision assessment may include the steps below of method 700. The method 700 useful to set a probability of collision in the method of FIG. 6 commences at 702.

At 704, for each of a number of edges of the planning graph 400 that has a respective probability of a collision with one or more objects in the environment 100 (such as dynamic object A 104) below a defined threshold probability of a collision, the system 200 assigns a weight with a value equal to or greater than zero.

At 706, for each of a number of edges of the planning graph 400 with a respective probability of a collision with one or more objects in the environment 100 above the defined threshold probability of a collision, the system 200 assigns a weight with a value less than zero. The method 700 useful to set a probability of collision in the method of FIG. 6 concludes at 708.

Figure 8:
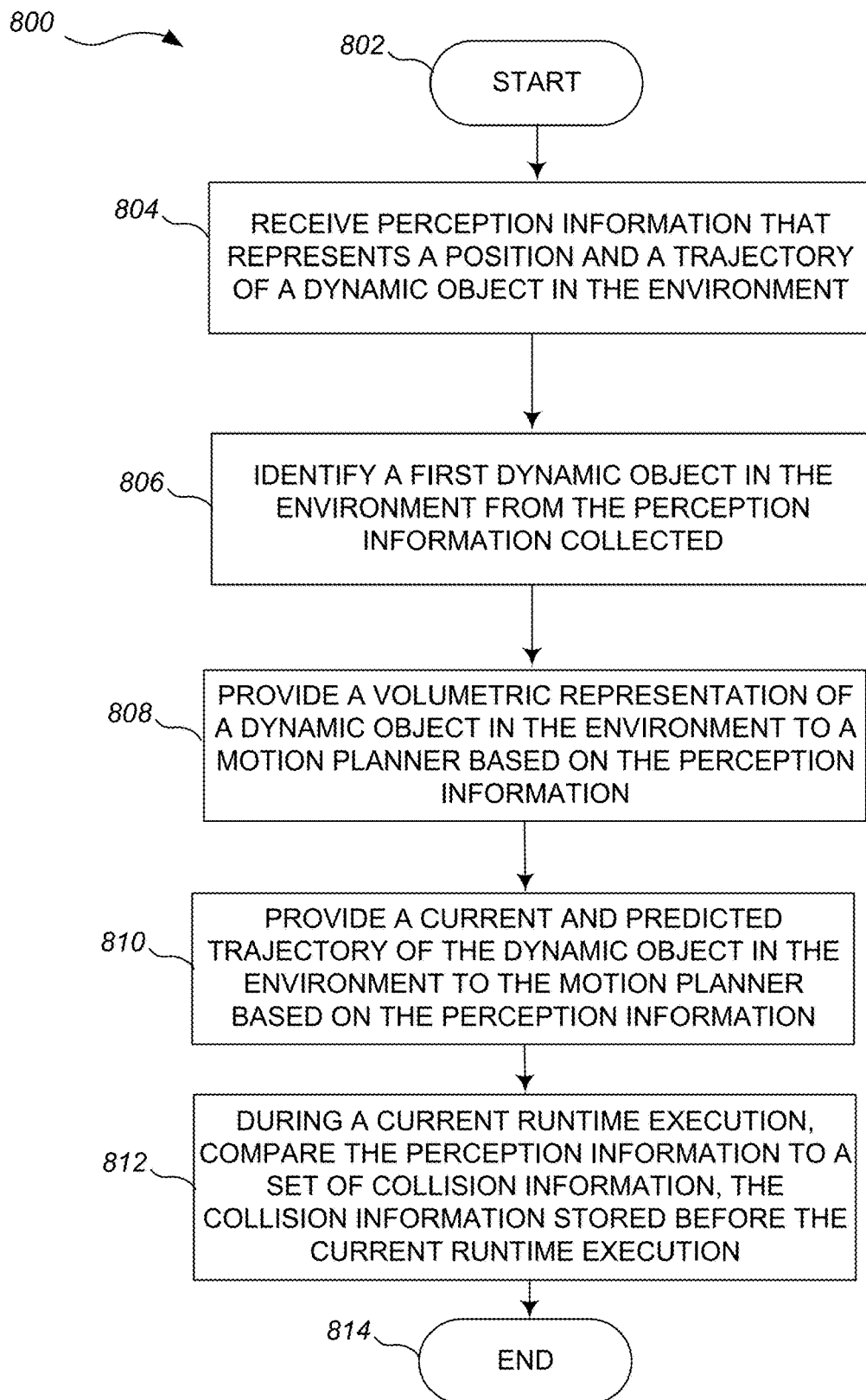
FIG. 8 is a flow diagram showing a method to perform a collision assessment and implement the motion plan useful in the method of FIG. 6, according to one illustrated embodiment.

FIG. 8 is a flow diagram showing a method 800 to perform a collision assessment and implement the motion plan useful in the method of FIG. 6, according to one illustrated embodiment. The method 800 to perform a collision assessment and implement the motion plan useful in the method of FIG. 6 commences at 802.

At 804, the system 200 receives perception information that represents a position and trajectory of a dynamic object, such as dynamic object A 104, in the environment 100 in which the vehicle 102 operates.

At 806, the system 200 identifies, by an object detector, at least a first dynamic object in the environment from the perception information 302 collected via the one or more sensors 282.

At 808, the system 200 provides a volumetric representation of at least one dynamic object in the environment 100 to the motion planner 280.

At 810, during a current runtime execution, the system 200 compares the perception information 302 to a set of information corresponding to volumetric representations of 3D space swept by the vehicle when making transitions, represented by edges of the planning graph, from one state to another state. The information corresponding to volumetric representations of 3D space swept by the vehicle when making transitions, represented by edges of the planning graph, from one state to another state is stored before the current runtime execution. The method 800 to perform a collision assessment and implement the motion plan useful in the method of FIG. 6 concludes at 814.

Figure 9:
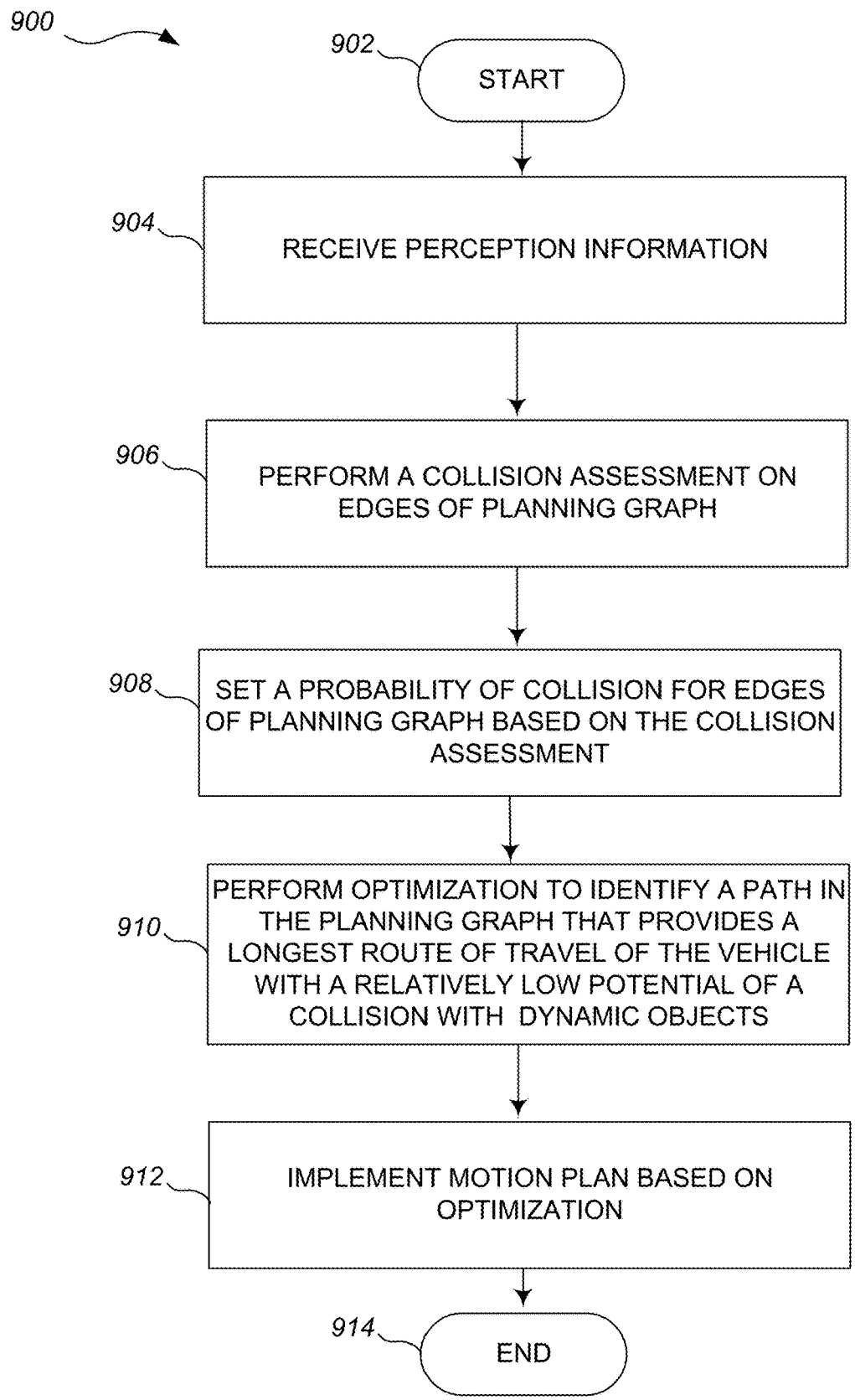
FIG. 9 is a flow diagram showing a method to identify the longest-route paths for vehicles via planning graphs that avoid collision with dynamic objects, according to one illustrated embodiment.

FIG. 9 is a flow diagram showing a method 900 to identify the longest-route paths for vehicles via planning graphs that avoid collision with dynamic objects, according to one illustrated embodiment. The method 900 to identify the longest-route paths for vehicles via planning graphs that avoid collision with dynamic objects commences at 902.

At 904, the system 200 receives perception information 302 that represents the environment 100 in which the vehicle 102 operates.

At 906, the system 200 performs a collision assessment on each of two or more of the edges of a planning graph, such as planning graph 500.

At 908, for each of two or more edges of the planning graph 500, the system 200 sets a probability of collision based at least in part on the collision assessment.

At 910, the system 200 performs an optimization to identify a path, such as path 512, in the resulting planning graph 500 that provides a longest route of travel of the vehicle 102 in two-dimensional or three-dimensional space as specified by the path with a relatively low potential of a collision with one or more dynamic objects, such as dynamic object B 112, in the environment 100 in which the vehicle 102 operates.

At 912, the system 200 implements a motion plan with the relatively low potential of a collision with one or more dynamic objects, such as dynamic object B 112, in the environment 100 in which the vehicle 102 operates based at least in part on the optimization. The method 900 to identify the longest-route paths for vehicles via planning graphs that avoid collision with dynamic objects concludes at 914.

Figure 10:
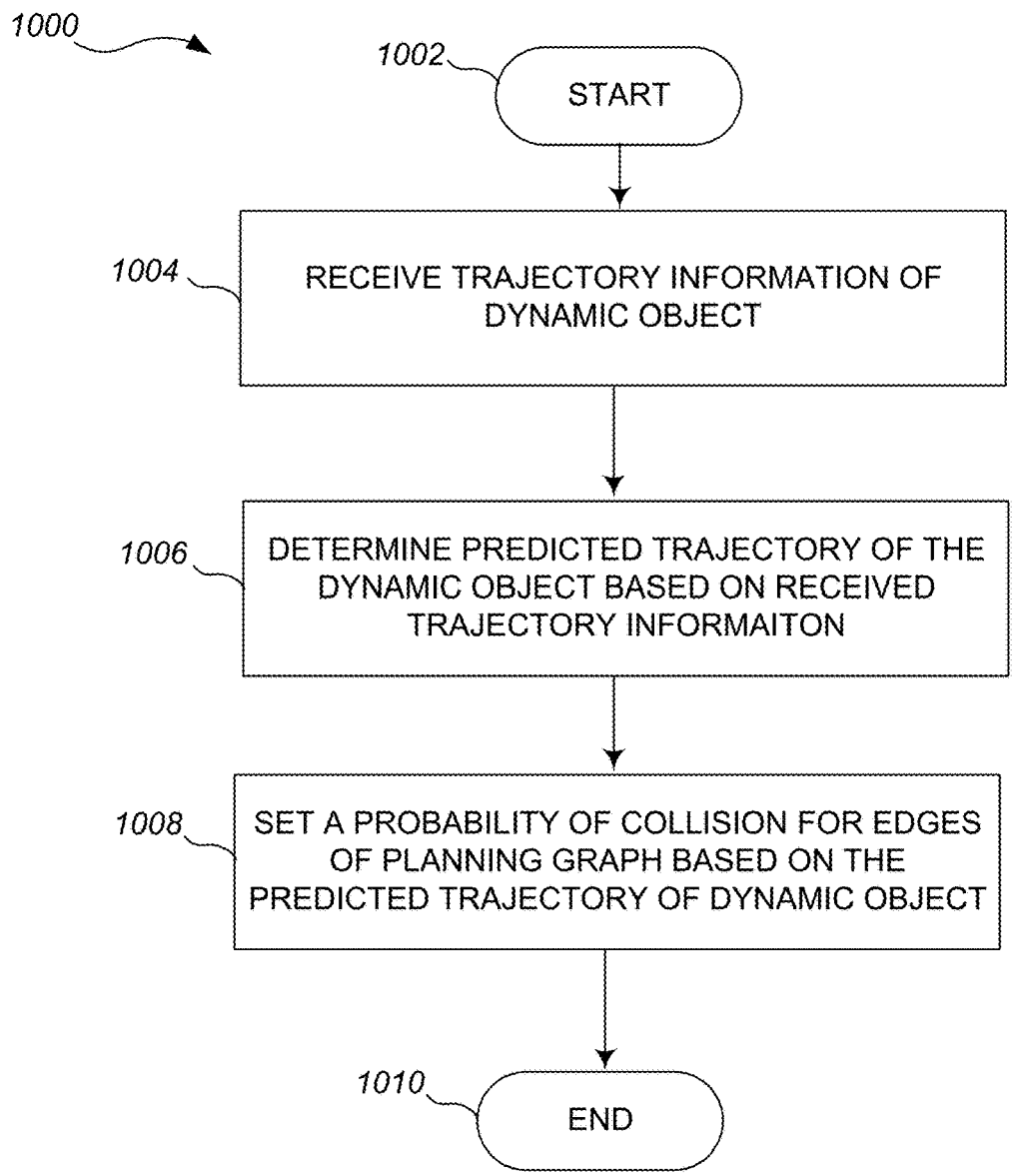
FIG. 10 is a flow diagram showing a method to perform a collision assessment useful in the method of FIG. 9, according to one illustrated embodiment.

FIG. 10 is a flow diagram showing a method 1000 to perform a collision assessment useful in the method of FIG. 9, according to one illustrated embodiment. The method 1000 to perform a collision assessment useful in the method of FIG. 9 commences at 1002.

At 1004, the system 200 receives trajectory information of a dynamic object, such as dynamic object B 112.

At 1006, the system 200 determines a predicted trajectory of the dynamic object, such as dynamic object B 112, based on the received trajectory information.

At 1008, the system 200 sets a probability of collision for each of two or more edges of the planning graph 500 based at least in part on a predicted trajectory of the dynamic object. The probability of collision may also be set based at least in part on a predicted trajectory of the dynamic object that is based at least in part on a change in a trajectory of the vehicle 102. The method 1000 to perform a collision assessment useful in the method of FIG. 9 concludes at 1010.

Figure 11:
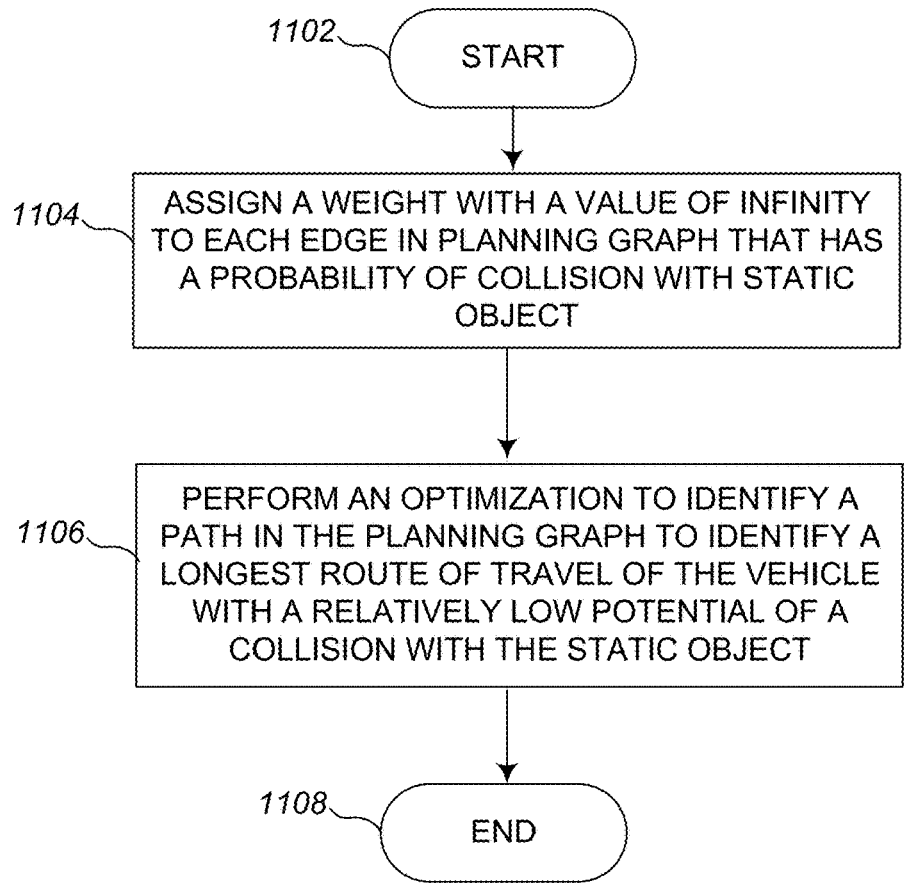
FIG. 11 is a flow diagram showing a method to identify the paths for vehicles via planning graphs that avoid collision with static objects useful with the method of FIG. 9 to identify the longest-route paths for vehicles via planning graphs that avoid collision with dynamic objects, according to one illustrated embodiment.

FIG. 11 is a flow diagram showing a method 1100 to identify the paths for vehicles via planning graphs that avoid collision with static objects useful with the method of FIG. 9 to identify the longest-route paths for vehicles via planning graphs that avoid collision with dynamic objects, according to one illustrated embodiment. The method 1100 to identify the paths for vehicles via planning graphs that avoid collision with static objects useful with the method of FIG. 9 to identify the longest-route paths for vehicles via planning graphs that avoid collision with dynamic objects commences at 1102.

At 1104, for each of a number of edges of the planning graph 500 that has a respective probability of a collision with the at least one static object in the environment, such as static object C 108, the system 200 assigns a weight with a value of infinity.

At 1106, the system 200 performs an optimization to identify a path in the resulting planning graph 500 to identify a longest route of travel of the vehicle 102 in two-dimensional or three-dimensional space as specified by the path with a relatively low potential of a collision with one or more static objects in the environment 100 in which the vehicle 102 operates. The method 1100 to identify the paths for vehicles via planning graphs that avoid collision with static objects useful with the method of FIG. 9 to identify the longest-route paths for vehicles via planning graphs that avoid collision with dynamic objects concludes at 1108.

Figure 12:
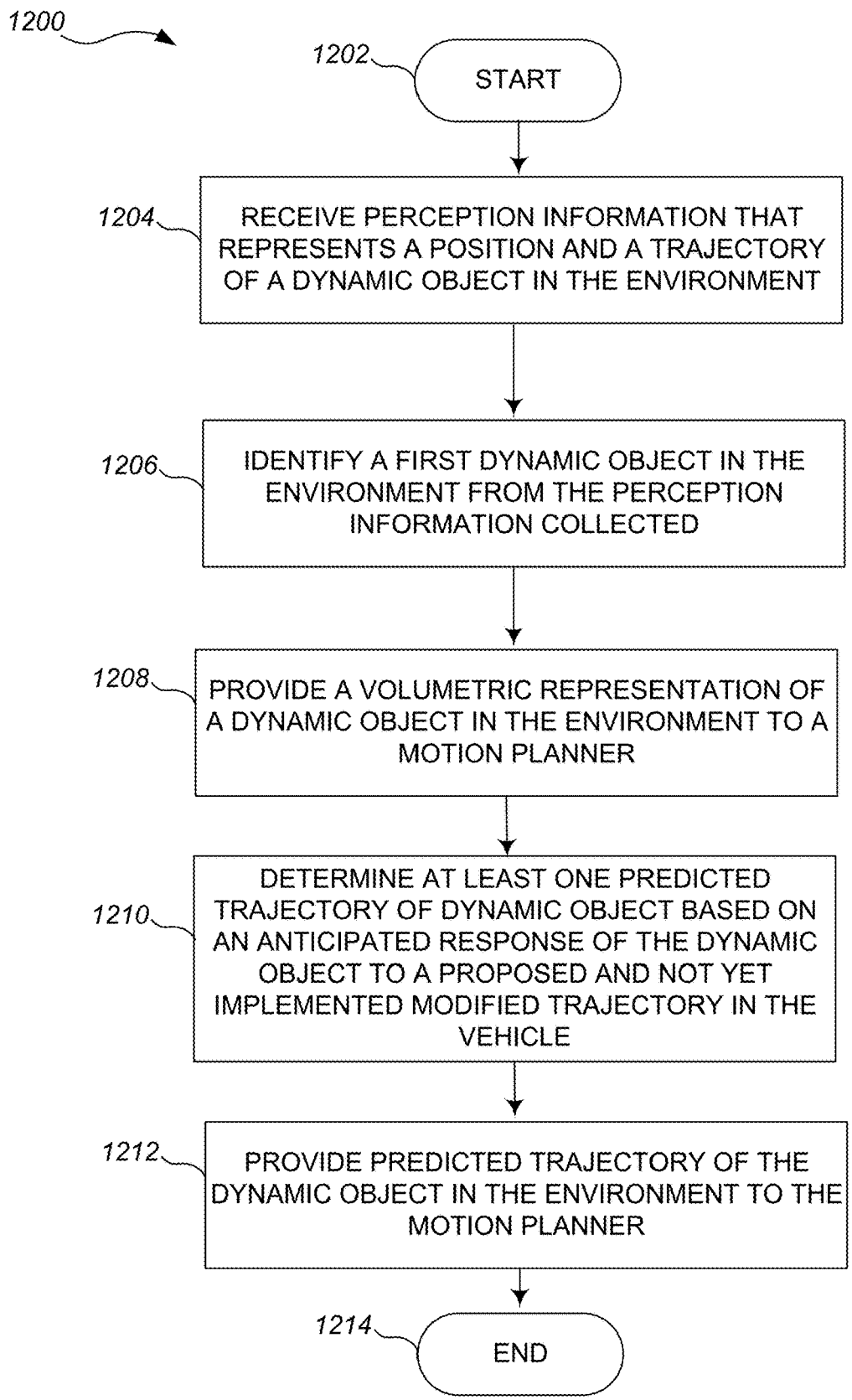
FIG. 12 is a flow diagram showing a method to determine predicted trajectory information of a dynamic object useful with the method of FIG. 9 to identify longest-route paths for vehicles via planning graphs that avoid collision with dynamic objects, according to one illustrated embodiment.

FIG. 12 is a flow diagram showing a method 1200 to determine predicted trajectory information of a dynamic object useful with the method of FIG. 9 to identify longest-route paths for vehicles via planning graphs that avoid collision with dynamic objects, according to one illustrated embodiment. The method 1200 to determine predicted trajectory information of a dynamic object useful with the method of FIG. 9 to identify longest-route paths for vehicles via planning graphs that avoid collision with dynamic objects commences at 1202.

At 1204, the system 200 receives perception information 302 that represents a position and a trajectory of at least one dynamic object, such as dynamic object B 112, in the environment 100. The system 200 may receive the perception information 302 at motion planner 280. The perception information 302 may be collected via one or more sensors 282 that are carried by the vehicle 102.

At 1206, the system 200 identifies, by an object detector 284, at least a first dynamic object in the environment 100, such as dynamic object B 112, from the perception information 302 collected via the one or more sensors 282.

At 1208, the system 200 provides a volumetric representation 304 of at least one dynamic object in the environment 100, such as dynamic object B 112, to the motion planner 280.

At 1210, the system 200, via object behavior predictor 286, determines at least one predicted trajectory, represented by predicted trajectory information 306, of at least one dynamic object, such as dynamic object B 112. This is based on an anticipated response of the at least one dynamic object to a proposed and not yet implemented modified trajectory in the vehicle 102.

At 1212, the system 200 provides to the motion planner 280, via object behavior predictor 286, a predicted trajectory, represented by predicted trajectory information 306, of at least one dynamic object in the environment 100. The method 1200 to determine predicted trajectory information of a dynamic object useful with the method of FIG. 9 to identify longest-route paths for vehicles via planning graphs that avoid collision with dynamic objects concludes at 1214.

Figure 13:
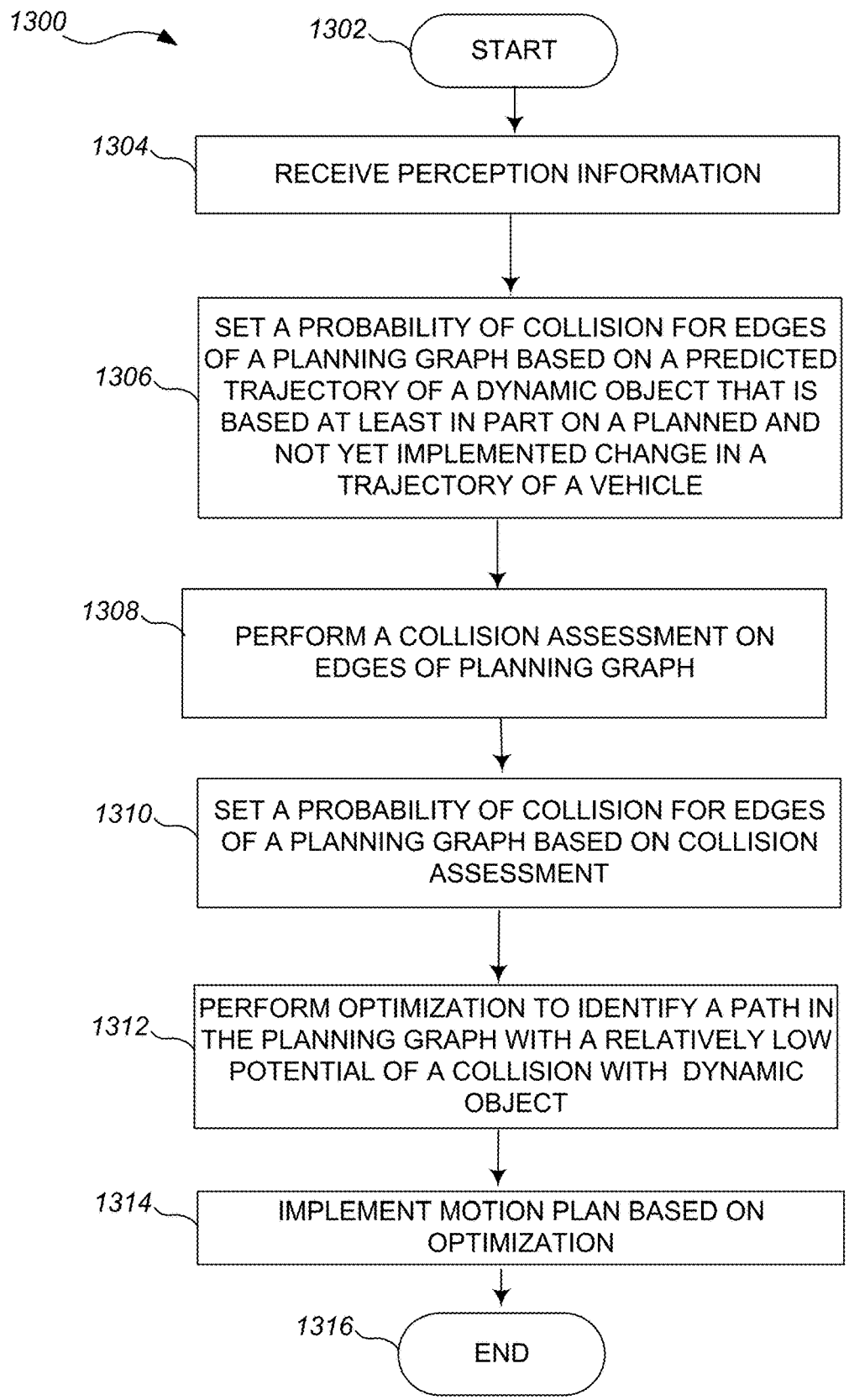
FIG. 13 is a flow diagram showing a method to identify route paths for vehicles via planning graphs that avoid collision with dynamic objects based on a planned and not yet implemented change in a trajectory of the vehicle, according to one illustrated embodiment.

FIG. 13 is a flow diagram showing a method 1300 to identify route paths for vehicles via planning graphs, such as planning graph 500, which avoid collision with dynamic objects based on a planned and not yet implemented change in a trajectory of the vehicle 102, according to one illustrated embodiment. The method 1300 to identify route paths for vehicles via planning graphs that avoid collision with dynamic objects based on a planned and not yet implemented change in a trajectory of the vehicle 102 commences at 1302.

At 1304, the system 200 receives perception information 302 that represents the environment 100 in which the vehicle 102 operates.

At 1306, the system 200 sets a probability of collision for each of two or more edges of the planning graph 500 based at least in part on a predicted trajectory of the dynamic object B 112 that is based at least in part on a planned and not yet implemented change in a trajectory of the vehicle 102.

At 1308, the system 200 performs, via the motion planner 280, a collision assessment on each of two or more of the edges of the planning graph 500.

At 1310, for each of two or more edges of the planning graph 500, the system 200, via the motion planner 280, sets a probability of collision based at least in part on the collision assessment.

At 1312, the system 200, via the motion planner 280, performs an optimization to identify a path in the resulting planning graph 500 with a relatively low potential of a collision with one or more dynamic objects in the environment 100 in which the vehicle 102 operates.

At 1314, the system 200 implements a motion plan with the relatively low potential of a collision with one or more dynamic objects in the environment 100 in which the vehicle 102 operates based at least in part on the optimization. The method 1300 to identify route paths for vehicles via planning graphs which avoid collision with dynamic objects based on a planned and not yet implemented change in a trajectory of the vehicle 102 concludes at 1316.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as hard disk drives, CD ROMs and computer memory.

The various embodiments described above can be combined to provide further embodiments. All of the commonly assigned US patent application publications, US patent applications, foreign patents, and foreign patent applications referred to in this specification and/or listed in the Application Data Sheet, including but not limited International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 016/122840, filed Jan. 5, 2016, entitled "SPECIALIZED ROBOT MOTION PLANNING HARDWARE AND METHODS OF MAKING AND USING SAME"; and U.S. patent application Ser. No. 62/616,783, filed Jan. 12, 2018 entitled "APPARATUS, METHOD AND ARTICLE TO FACILITATE MOTION PLANNING OF AN AUTONOMOUS VEHICLE IN AN ENVIRONMENT HAVING DYNAMIC OBJECTS" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of operation in a processor-based system to determine paths for vehicles via planning graphs, where each planning graph respectively comprises a plurality of nodes connected by edges, each node which represents, implicitly or explicitly, time and variables that characterize a state of a vehicle which operates in an environment and which environment includes one or more dynamic objects, and each edge represents a transition between a respective pair of nodes, the method comprising:

receiving perception information that represents the environment in which the vehicle operates;

performing a collision assessment on each edge of two or more of the edges of a planning graph;

for each of two or more edges of the planning graph, setting a respective probability of collision for a respective edge of the two or more edges based at least in part on the collision assessment on the respective edge, wherein setting a respective probability of collision for the respective edge for each of two or more edges of the planning graph based at least in part on the collision assessment includes setting a respective probability of collision for each of two or more edges of the planning graph based at least in part on a predicted trajectory of the one or more dynamic objects that is based at least in part on a change in a trajectory of the vehicle;

performing an optimization on the edges of a resulting planning graph, each of the edges having the respective probability of collision that was set therefor, to identify a path in the resulting planning graph that provides a longest route of travel of the vehicle in two-dimensional or three-dimensional space in the environment in which the vehicle operates; and implementing a motion plan based at least in part on the optimization.

2. The method of claim 1, wherein performing an optimization on the edges of the resulting planning graph to identify a path in the resulting planning graph that provides a longest route of travel of the vehicle in two-dimensional or three-dimensional space in the environment in which the vehicle operates includes performing an optimization on the edges of the resulting planning graph to identify a longest route represented by a path in the resulting planning graph with a lowest potential of a collision with one or more dynamic objects in the environment in which the vehicle operates.

3. The method of claim 1, wherein performing an optimization on the edges of the resulting planning graph to identify a path in the resulting planning graph that provides a longest route of the vehicle in two-dimensional or three-dimensional space in the environment in which the vehicle operates includes performing an optimization on the edges of the resulting planning graph to identify a path in the resulting planning graph to identify a longest route of the vehicle in two-dimensional or three-dimensional space as specified by the path with a lowest potential of a collision with one or more dynamic objects in the environment in which the vehicle operates along a length of the route, the length of the route defined at least in part by when the vehicle runs out of fuel.

4. The method of claim 1, wherein setting a respective probability of collision for the respective edge for each of two or more edges of the planning graph based at least in part on the collision assessment includes setting a respective probability of collision for each of two or more edges of the planning graph based at least in part on a current trajectory of the one or more dynamic objects.

5. The method of claim 1, wherein setting a respective probability of collision for the respective edge for each of two or more edges of the planning graph based at least in part on the collision assessment includes setting a respective probability of collision for each of two or more edges of the planning graph based at least in part on a change in a trajectory of the one or more dynamic objects.

6. The method of claim 1, wherein setting a respective probability of collision for the respective edge for each of two or more edges of the planning graph based at least in part on the collision assessment includes setting a respective probability of collision for each of two or more edges of the planning graph based at least in part on a predicted trajectory of the one or more dynamic objects.

7. The method of claim 1, wherein the planning graph for the vehicle is a multi-dimensional graph that represents both a position and a velocity of the vehicle, and performing an optimization on the edges of the resulting planning graph to identify a path in the resulting planning graph includes performing the optimization to identify a path in the resulting planning graph which represents the position and the velocity of the vehicle.

8. The method of claim 7, wherein the velocity represents both a speed and a direction of the vehicle, and performing an optimization on the edges of the resulting planning graph to identify a path in the resulting planning graph includes performing the optimization to identify a path in the resulting planning graph which represents the speed and the direction of the vehicle.

9. The method of claim 8, wherein the direction represents a pitch, a roll, and a yaw of the vehicle, and performing an optimization on the edges of the resulting planning graph to identify a path in the resulting planning graph includes performing the optimization to identify a path in the resulting planning graph which represents the pitch, the roll and the yaw of the vehicle.

10. The method of claim 7, wherein the planning graph for the vehicle represents an acceleration of the vehicle, and performing an optimization on the edges of the resulting planning graph to identify a path in the resulting planning graph includes performing the optimization to identify a path in the resulting planning graph which represents the acceleration of the vehicle.

11. The method of claim 7, wherein the planning graph for the vehicle represents a maximum time or distance of travel obtainable by the vehicle, and performing an optimization on the edges of the resulting planning graph to identify a path in the resulting planning graph includes performing the optimization to identify a path in the resulting planning graph which represents the maximum time or distance of travel obtainable by the vehicle.

12. The method of claim 7, wherein performing an optimization on the edges of the resulting planning graph includes performing a shortest path algorithm for traversing the edges of the resulting planning graph based on assigned weights to edges of the resulting planning graph.

13. The method of claim 7, wherein the planning graph for the vehicle represents one or more physical constraints or performance constraints of the vehicle, and performing an optimization on the edges of the resulting planning graph to identify a path in the resulting planning graph includes performing the optimization to identify a path in the resulting planning graph which represents the physical or performance constraints of the vehicle.

14. The method of claim 7, wherein the planning graph for the vehicle represents one or more physical constraints or performance constraints of a dynamic object, and performing an optimization on the edges of the resulting planning graph to identify a path in the resulting planning graph includes performing the optimization to identify a path in the resulting planning graph which represents the physical or performance constraints of the one or more dynamic objects.

15. The method of claim 1, wherein there is at least one static object in the environment, further comprising:

for each of a number of the edges of the planning graph that has a respective probability of a collision with the at least one static object in the environment assigning a weight with a value of infinity, and wherein performing an optimization on the edges of the resulting planning graph to identify a path in the resulting planning graph includes performing an optimization to identify a path in the resulting planning graph to identify a longest route of travel of the vehicle in two-dimensional or three-dimensional space as specified by the path with a relatively low potential of a collision with one or more static objects in the environment in which the vehicle operates.

16. The method of claim 1, wherein receiving perception information includes receiving perception information that represents a position and a trajectory of the one or more dynamic objects in the environment.

17. The method of claim 16, wherein receiving perception information includes receiving perception information at a motion planner, the perception information collected via one or more sensors that are carried by the vehicle.

18. The method of claim 17, further comprising:
identifying, by an object detector, at least a first one of the one or more dynamic objects in the environment from the perception information collected via the one or more sensors.

19. The method of claim 17, further comprising:
providing a volumetric representation of at least one of the one or more dynamic objects in the environment to the motion planner.

20. The method of claim 17, further comprising:
providing a current trajectory of at least one of the one or more dynamic objects in the environment to the motion planner.

21. The method of claim 17, further comprising:
providing a predicted trajectory of at least one of the one or more dynamic objects in the environment to the motion planner.

22. The method of claim 21, further comprising:
determining at least one predicted trajectory of at least one of the one or more dynamic objects based on an anticipated response of the at least one of the one or more dynamic objects to a proposed and not yet implemented modified trajectory in the vehicle.

23. The method of claim 17, further comprising:
during a current runtime execution, comparing the perception information to a set of information corresponding to volumetric representations of 3D space swept by the vehicle when making transitions, represented by edges of the planning graph, from one state to another state, the information corresponding to volumetric representations of 3D space swept by the vehicle when making transitions, represented by edges of the planning graph, from one state to another state which was stored in one or more nontransitory processor-readable media before the current runtime execution, via a hardware processor.

24. A processor-based system to determine paths for vehicles via planning graphs, where each planning graph respectively comprises a plurality of nodes connected by edges, each node which represents, implicitly or explicitly, time and variables that characterize a state of a vehicle that operates in an environment, and each edge representing a transition between a respective pair of nodes, the system comprising:
at least one processor; and
at least one nontransitory processor-readable medium that stores at least one of processor-executable instructions or data which, when executed by the at least one processor, causes the at least one processor to:
receive perception information that represents the environment in which the vehicle operates;
perform a collision assessment on each edge of two or more of the edges of a planning graph;
for each of two or more edges of the planning graph, set a respective probability of collision for a respective edge of the two or more edges based at least in part on the collision assessment on the respective edge, wherein setting a respective probability of collision for the respective edge for each of two or more edges of the planning graph based at least in part on the collision assessment includes setting a respective probability of collision for each of two or more edges of the planning graph based at least in part on a predicted trajectory of the one or more dynamic objects that is based at least in part on a change in a trajectory of the vehicle;
perform an optimization on the edges of a resulting planning graph, each of the edges having the respective probability of collision that was set therefor, to identify a path in the resulting planning graph that provides a longest route of travel of the vehicle in two-dimensional or three-dimensional space in the environment in which the vehicle operates; and
implement a motion plan based at least in part on the optimization.

* * * * *